United States Patent [19]

Otsuki

[11] Patent Number: 4,805,044
[45] Date of Patent: Feb. 14, 1989

[54] IDLER GEAR CUT-OFF MECHANISM FOR A CASSETTE TAPE RECORDER

[75] Inventor: Akira Otsuki, Iwaki, Japan

[73] Assignee: Alpine Electronics, Inc., Japan

[21] Appl. No.: 75,226

[22] Filed: Jul. 20, 1987

Related U.S. Application Data

[63] Continuation of Ser. No. 688,042, Dec. 31, 1984, abandoned.

[30] Foreign Application Priority Data

Dec. 28, 1983 [JP] Japan ................. 58-199577

[51] Int. Cl.$^4$ ................. G11B 5/54; G11B 15/00
[52] U.S. Cl. ................. 360/105; 360/137
[58] Field of Search ............. 360/71, 73, 74.1, 85, 360/95, 90, 93, 96.1, 96.3, 96.4, 96.5, 105, 137

[56] References Cited

U.S. PATENT DOCUMENTS

| | | | |
|---|---|---|---|
| 3,877,074 | 4/1975 | Güttinger | 360/137 X |
| 4,330,801 | 5/1982 | Morinaga et al. | 360/137 X |
| 4,348,704 | 9/1982 | Takagi et al. | 360/137 X |
| 4,399,475 | 8/1983 | Shimomae | 360/96.3 |
| 4,430,680 | 2/1984 | Yamaguchi et al. | 360/137 |
| 4,479,155 | 10/1984 | Takai et al. | 360/96.5 |
| 4,611,251 | 9/1986 | Yokoo | 360/85 |
| 4,626,940 | 12/1986 | Kobayashi | 360/96.3 |

FOREIGN PATENT DOCUMENTS

| | | | |
|---|---|---|---|
| 3219527 | 12/1983 | Fed. Rep. of Germany | 360/137 |
| 56-134345 | 10/1981 | Japan | 360/96.5 |
| 56-169247 | 12/1981 | Japan | 360/75 |

*Primary Examiner*—Stuart N. Hecker
*Assistant Examiner*—Benjamin E. Urcia
*Attorney, Agent, or Firm*—Guy W. Shoup; Paul J. Winters

[57] ABSTRACT

A cassette type tape recorder comprises a magnetic head for recording on and reproducing from a magnetic tape in a tape cassette, a drive gear, a head displacing cam mechanism for changing-over the position of the magnetic head between its play and non-play positions, an idler for driving the head displacing cam mechanism by drive power transmitted from the drive gear, a cut-off gear movable and engageable with the drive gear and the idler, the cut-off gear being arranged to cut off the drive power transmission from the drive gear to the idler when the cut-off gear is in a cut-off position, and a cut-off gear displacing cam mechanism for displacing the cut-off gear to said the cut-off position when the magnetic head is brought into its play position by the head displacing cam mechanism.

1 Claim, 32 Drawing Sheets

IDLER GEAR CUT-OFF MECHANISM FOR A CASSETTE TAPE RECORDER

This is a continuation application from application Ser. No. 688,042 filed Dec. 31, 1984, now abandoned.

BACKGROUND OF THE INVENTION

1. Field of the Invention

The present invention relates to a cassette type tape recorder and more particularly to a drive power transmission mechanism in the performance or play mode in a cassette type tape recorder.

2. Description of the Prior Art

In the conventional cassette type tape recorder, there has been a disadvantage that idlers in a drive power transmission mechanism are always rotating in the performance or play mode and generate noise due to engagement of rotating gears.

SUMMARY OF THE INVENTION

An object of the present invention is to eliminate the disadvantage in the prior art cassette type tape recorder.

Another object of the present invention is to provide a cassette type tape recorder in which noise due to engagement of gear rotating in the performance or play mode is reduced.

To attain the above objects, according to the present invention, the cassette type tape recorder comprises: a drive gear; a head displacing cam mechanism for changing-over the position of a magnetic head between a play position and a non-play position; a cam drive idler for driving the head displacing cam mechanism by drive power transmitted from the drive gear; a movable cut-off gear engageable with the drive gear and the cam drive idler for cutting-off the drive power transmission from the drive gear to the cam drive idler; and a gear-displacing cam mechanism for displacing the cut-off gear to thereby cut off the drive power transmission from the drive gear to the cam drive idler after the magnetic head is displaced to the play position by the operation of the head displacing cam mechanism.

The above and other objects and features will be apparent from the following description in conjunction with the accompanying drawings.

BRIEF DESCRIPTION OF THE DRAWINGS

All the drawings are for illustrating a cassette type tape recorder according to an embodiment of the present invention, in which:

FIGS. 33 to 36 are diagrams for explaining the operation of a cut-off gear, in which:

FIGS. 33 and 34 are partial plan and partial cross-sectional views, respectively, each showing a state other than performance or play;

FIGS. 35 and 36 are partial plan and partial cross-sectional views, respectively, each showing a state of performance or play;

FIGS. 37 to 41 are diagrams for explaining the operation of a first and a second stop lever, in which:

FIG. 37 is a partial plan view showing a state before performance or play;

FIG. 38 is a partial plan view showing a initial state entering performance or play;

FIG. 39 is a partial plan view showing a state where the first stop lever has been rotated at maximum by the control rotary member;

FIG. 40 is a partial plan view showing a state in performance or playing; and

FIG. 41 is a partial plan view showing a state where the pose is shifted from play to another pose.

DETAILED DESCRIPTION OF PREFERRED EMBODIMENT

Figure 1:
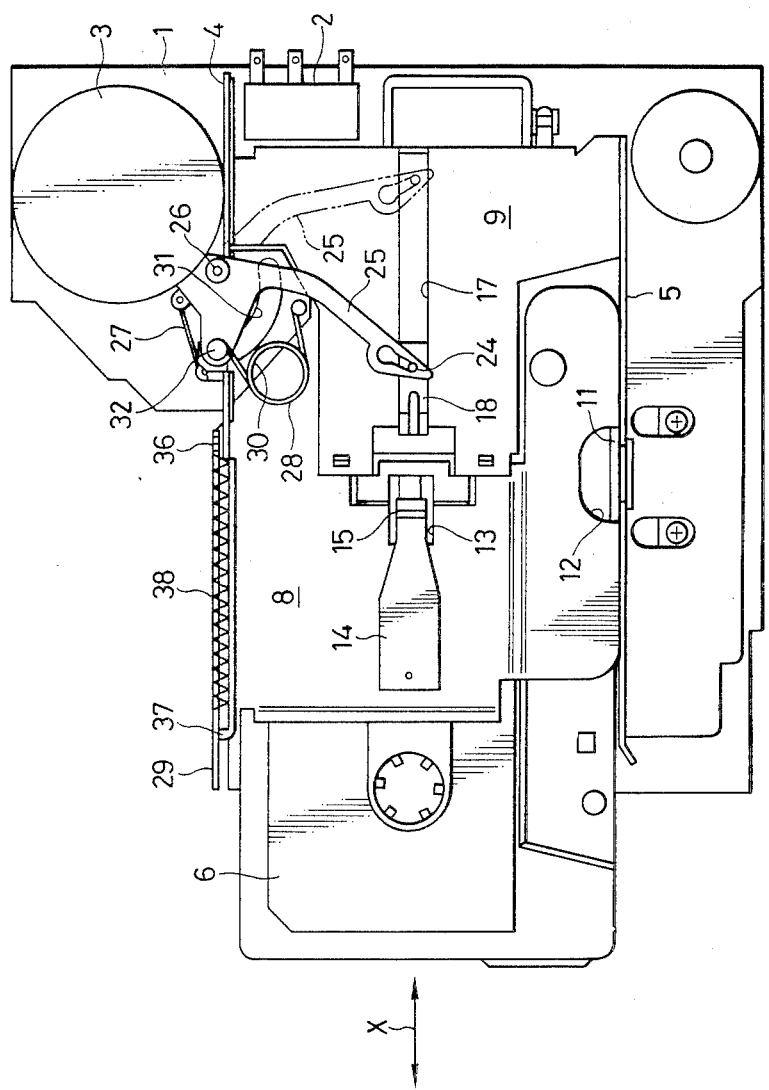
FIGS. 1 and 2 are plan and side views, respectively, each showing a state before a tape cassette is pushed into the tape recorder.

Referring to the drawings, an embodiment of the cassette tape recorder according to the present invention will be described below.

This tape recorder is provided with: (1) a cassette loading mechanism; (2); a reproducing mechanism; (3) a recorded position detecting mechanism; (4) a fast-forwarding/rewinding mechanism, and (5) an ejecting mechanism. These mechanisms will be explained in sequence by item. First, the cassette loading mechanism will be described below.

(1) Cassette Loading Mechanism

Particularly, in a case of a cassette type tape recorder for use in a vehicle, a vehicle driver operates the cassette tape recorder while driving the vehicle. Accordingly, the cassette tape recorder is arranged such that when a tape cassette is softly pushed into a cassette insertion port, the tape cassette is automatically pulled into the inside of the cassette insertion port and displaced to a performance or play position so that the reproducing operation is carried out thereat. When it is desired to suspend the reproducing operation and to take out the cassette, it is sufficient to depress an ejection switch button so that the operation of the cassette tape recorder is automatically stopped and the cassette is separated from the performance or play position, and the cassette is half-ejected from the cassette insertion port to thereby facilitate taking-out of the cassette.

Figure 2:
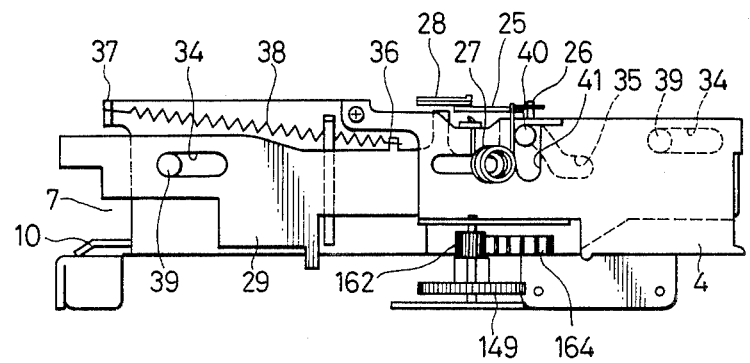
Figure 3:
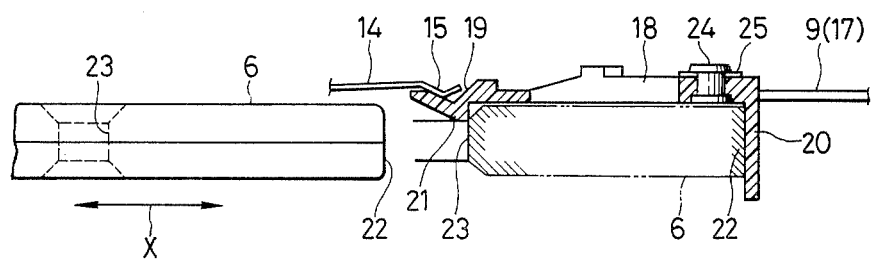
FIG. 3 is an enlarged cross-section of a slider.

A particular arrangement of the cassette loading mechanism will be described in conjuction with the accompanying drawings. FIGS. 1 and 2 are plan and side views, respectively, each showing a state before a cassette tape is pushed into the tape recorder, FIG. 3 is an enlarged cross-section of a slider, FIGS. 4 and 5 are plan and side views, respectively, each showing a state where a cassette tape is placed at its position of performance or play, and FIG. 6 is a partial side view showing a state where the cassette is held at its position of performance or play.

As shown in FIG. 1, a main switch 2, a main motor 3, side plates 4, 5 and various mechanisms, which will be described later, are attached on a chassis 1 at predetermined positions. In FIG. 4, the main switch 2 and the main motor 3 are not illustrated.

Figure 4:
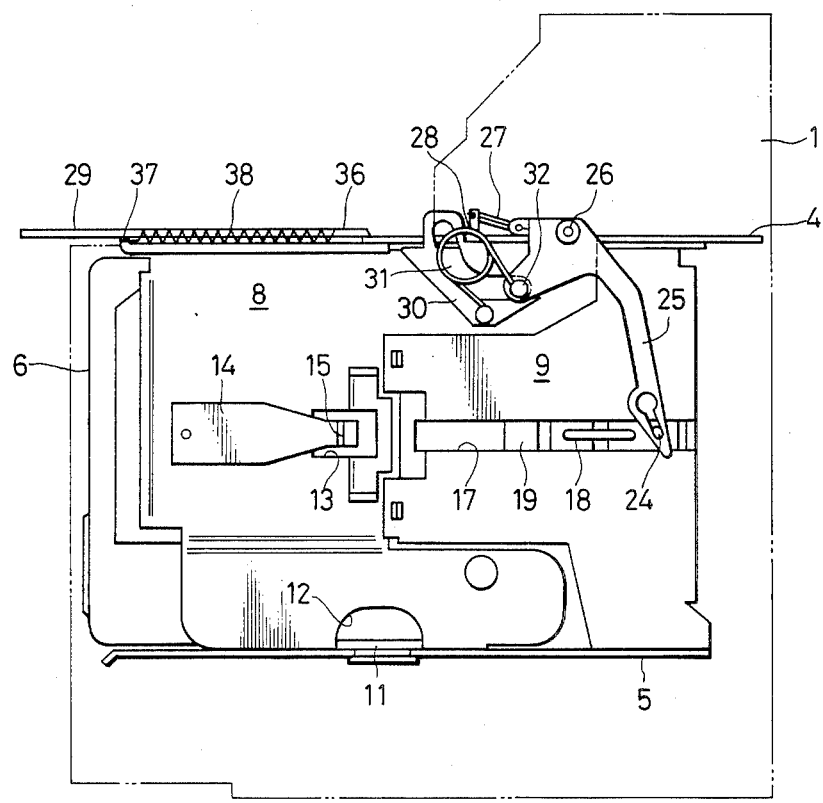
FIGS. 4 and 5 are plan and side views, respectively, each showing a state where a cassette tape is placed at its position of performance or play.
Figure 5:
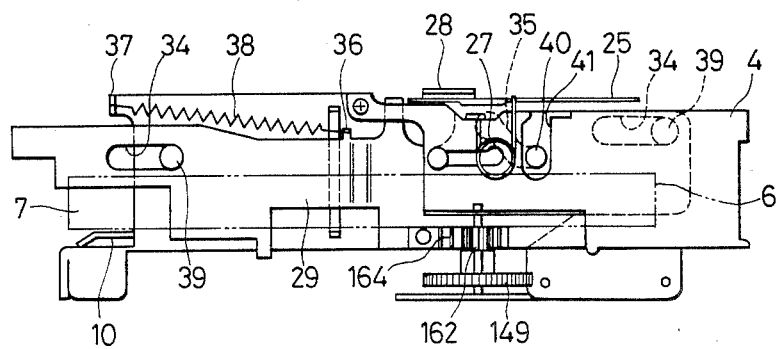

Referring to FIGS. 1 and 4, the side plates 4, 5 are arranged spaced from each other with a distance slightly larger than the width of a tape cassette 6. A cassette holder 8 is provided on the side of a cassette insertion port 7 between the side plates 4 and 5 (see FIGS. 2 and 5), and a cassette pressing plate 9 is provided on the side of the main switch 2 (see FIG. 1).

Figure 6:
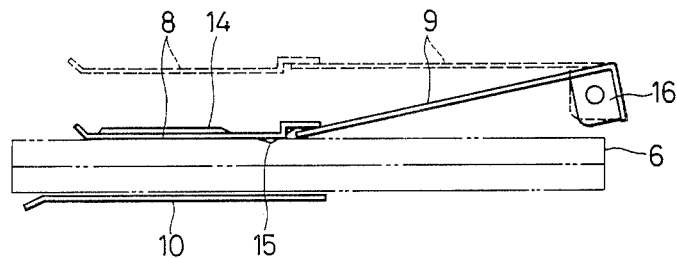
FIG. 6 is a partial side view showing a state where the tape cassette is held at its position of performance or play.

As shown in FIG. 6, below the cassette holder 8, there is provided a cassette receiving plate 10 with a predetermined space between the cassette holder 8 and the cassette receiving plate 10. The cassette holder 8 is arranged vertically movable relative to the cassette receiving plate 10. In order to smoothly guide the up and down operation of the cassette holder 8, as shown in FIGS. 1 and 4, a holder guide member 11 is attached on the inner surface of the side plate 5. The holder guide member 11 is molded with a synthetic material having a small friction coefficient, and extends over an entire length within a range of the up and down operation of the cassette holder 8. Further, at a position opposing to the holder guide member 11 of the cassette holder 8, there is provided a recess portion 12 in which the holder guide member 11 is partially inserted. A square through-hole 13 is formed in the cassette holder 8 at a position on the side of holder pressing plate 9. A forward end V-shaped portion 15 of a plate spring 14 attached onto the upper surface of the cassette holder 8 is disposed over the hole 13.

The holder pressing plate 9 is arranged to be downwardly rotatable about a base portion 16 (see FIG. 6) thereof provided on the side of the main switch 2 and always downwardly elastically urged by a spring (not shown). As shown in FIGS. 1 and 4, substantially at a center of the holder pressing plate 9, there is provided a slider guide slot 17 in the same direction as the X-direction (see FIG. 1) along which a tape cassette is inserted/removed, and a slider 18 molded with a synthetic resin material of a small friction coefficient the slider supported in a slider guide slot 17.

As shown in FIG. 3, the slider 18 is formed, at one end thereof, with a V-shaped engage portion 19 engageable with the V-shaped portion 15 of the plate spring 14, and at the other end, with a hang-down cassette-contact portion 20. The space between a lower projecting portion 21 of the V-shaped engage portion 19 and the cassette contact portion 20 is substantially identical with a space between a side surface 22 of a short side of the tape cassette and a circumferential surface 23 of a drive shaft insertion hole near the side surface.

An insertion/removal lever 25 is rotatably coupled at its free end with the upper surface of the slider 18 through a falling-off prevention pin 24. As shown in FIGS. 1 and 4, the root portion of the insertion/removal lever 25 is rotatably supported on the side plate 4 through a pin 26, and first and second coil springs 27 and 28 engage at one end with the root portion of the lever 25. The other end of the first coil spring 27 is connected with the side plate 4 as shown in FIGS. 2 and 5, and the other end of the second spring coil 28 is connected to a horizontal portion 30 of an ejection lever 29. A circular arc slot 31 having its center at the pin 26 is formed in the horizontal portion 30 and a joint pin 32 for connecting the second coil spring 28 and insertion/removal lever 25 is movably inserted through the circular arc slot 31.

Figure 7:
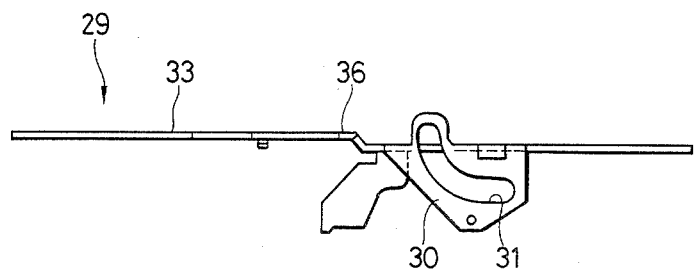
FIGS. 7 and 8 are plan and side views, respectively, of an ejection lever.
Figure 8:
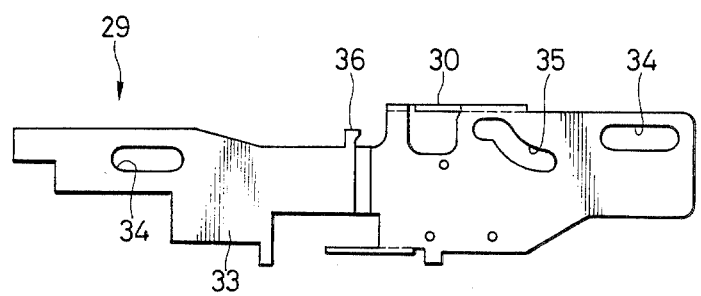

FIG. 7 and FIG. 8 are a plan and a side view of the ejection lever 29, respectively. The ejection lever 29 has the above-mentioned horizontal portion 30 and a vertical portion 33 extending in the longitudinal direction of the lever. As shown in FIG. 8, a pair of horizontally extending long holes 34 are provided near to the opposite ends of the vertical portion 33, and a stepped guide slot 35 is formed in an intermediate portion between the holes 34. A spring hanging protrusion 36 is provided on the vertical portion 33 substantially at the upper end center position thereof. The rear side from the protrusion 36 is inwardly bent as shown in FIG. 7.

Accordingly, in the state where the ejection lever 29 is incorporated into the tape recorder, as shown in FIGS. 1 and 4, the side on which the spring-hanging protrusion 36 of the vertical portion 33 is provided is located outside the side plate 4, and the side on which the horizontal portion 30 is provided is disposed inside the side plate 4. For this, at a middle portion of the side plate 4, there is provided a recess portion (not shown) through which a part of the vertical portion 33 passes and which allows the ejection lever 29 to move in the X-direction (see FIG. 1). A tension spring 38 is stretched between the spring-hanging protrusion 36 of the ejection lever 29 and a spring-hanging protrusion 37 provided at the end of the side plate 4, so that the ejection lever 29 is elastically urged always in one direction. As shown in FIGS. 2 and 5, two projecting guide pins 39 are provided on the side plate 4 at predetermined positions thereof, and the respective guide pins 39 are inserted into the long guide holes 34, so as to guide the movement of the ejection lever 29 in the X-direction.

An up/down pin 40 is projectingly provided on the side surface of the cassette holder 8. The up/down pin 40 is inserted through the stepped guide slot 35 and a longitudinal slot 41 formed in the side plate 4.

In the state before the tape cassette 6 is pushed into the tape recorder, as shown in FIG. 2, the up/down pin 40 is located in the upper part of each of the stepped guide slot 35 and slot section 41. Accordingly, as shown by a broken line in FIG. 6, the cassette holder 8 is at its upper position and the holder pressing plate 9 is in the horizontal state. The slider 18 and the free end of the insertion/removal lever 25 are located by the cassette holder 8 in their stand-by state. At this time, as shown in FIG. 3, the V-shaped engage portion 19 of the slider 18 is located under the V-shaped portion 15 of the plate spring 14 and engages with the V-shaped portion 15. Further, as shown in FIG. 2, an ejection lever 29 is located at the right hand position in the drawing with respect to the guide pin 39.

As shown in FIG. 1, the tape cassette 6 is inserted into a cassette insertion port 7 toward the cassette holder 8 with the magnetic head insertion opening (not shown) of the cassette opposed to the side plate 5. As shown in FIG. 3, when the side plate 22 of the short side of the tape cassette 6 comes into contact with the cassette contact portion 20, and if the tape cassette 6 is pushed succeedingly, the insertion/removal lever 25 counterclockwise rotates about the pin 26 against the elasticity of the first and second coil springs 27 and 28, and the slider 18 moves along the slider guide slot 17. When the insertion/removal lever 25 begins to rotate counterclockwise, the engage-stop end (movable end) of the first coil spring 27 at the insertion/removal lever 27 side gradually approaches the engage-stop end (fixed end) of the same spring at the side plate side. When the insertion/removal lever 25 comes to about half of the ratational tolerance range (about 40–60 degrees), both the engage-stop ends come to the nearest position, and the repelling force of the first coil spring 27 becomes maximum at this position. When the insertion/removal lever 25 has past this middle point, the direction of the first coil spring 27 changes (see FIG. 4), and the repelling power of the spring becomes useful for the rotation of the insertion/removal lever 25 (sliding of the slider 18).

The joint pin 32 moves along the circular arc slot 31 and the engage-stop end of the second coil spring 28 at the insertion/removal lever side (at the joint pin 32 side) gradually approaches the engage-stop end of the same spring at the ejection lever side so that the repelling force of the second coil spring 28 is accumulated. When the insertion/removal lever 25 further rotates and the insertion/removal lever side engage-stop end of the second coil spring has passed the nearest position from the ejection lever side engage-stop end of the same spring (just horizontal), the accumulated repelling force is useful for the rotation of the insertion/removal lever 25 (sliding of the slider 18), and the ejection lever 29 is elastically urged to the cassette insertion port 7. Thus, when each of the first and second coil springs 27 and 28 has passed a predetermined position, the insertion/removal lever 25 is automatically rotated by the repelling force accumulated in each of the springs 27 and 28, so that the tape cassette 6 sandwiched between the lower protrusion 21 and the cassette contact portion 20 is automatically pulled into the cassette holder 8.

The holder pressing plate 9 is elastically urged to be pushed down by a spring member, (not shown) and the ejection lever 29 is pulled always toward the cassette insertion port 7 by the tension spring 38. Before the insertion/removal side engage-stop end of the second coil spring 28 has reached the nearest position to the ejection lever side engage-stop end of the same coil spring, the spring force of the second coil spring 28 acting on the ejection lever 29 acts in the opposite direction to the tensile direction of the tension spring 38 to stop the movement of the ejection lever 29 to maintain the cassette holder 8 in its upper position. However, when the insertion/removal lever side engage-stop end has passed the position horizontally adjacent the ejection lever side engage-stop end, that is the nearest position therebetween, the repelling force accumulated in the second coil spring 28 acts on the ejection lever 29 in the tensile direction of the tension spring 38. Thus, in cooperation with the tension spring 38, the second coil spring 28 urges the ejection lever 29 to move to the cassette insertion port 7 so that the up/down pin 40 connected to the cassette holder 8 is relatively moved to the lower portion through the slanted portion in the stepped guide slot 35 of the ejection lever 29. At this time, the slot 41 of the side plate 4 prevents the up/down pin 40 from moving laterally and only allows it to move down. Accordingly, the cassette holder 8 loses its support at the stepped guide slot 35 as the ejection lever 29 moves, so that the cassette holder 8 is pressed down to the lower position of performance or play by the holder pressing plate 9 (see FIGS. 4, 5 and 6).

As described above, in the tape recorder according to present invention, after being pushed into a predetermined position, the tape cassette 6 is automatically pulled inside and located to a position of performance or play by the function of the first and second coil springs 27 and 28. The reproducing mechanism for effecting an operation of performance or play will be described next.

(2) Reproducing Mechanism

Figure 9:
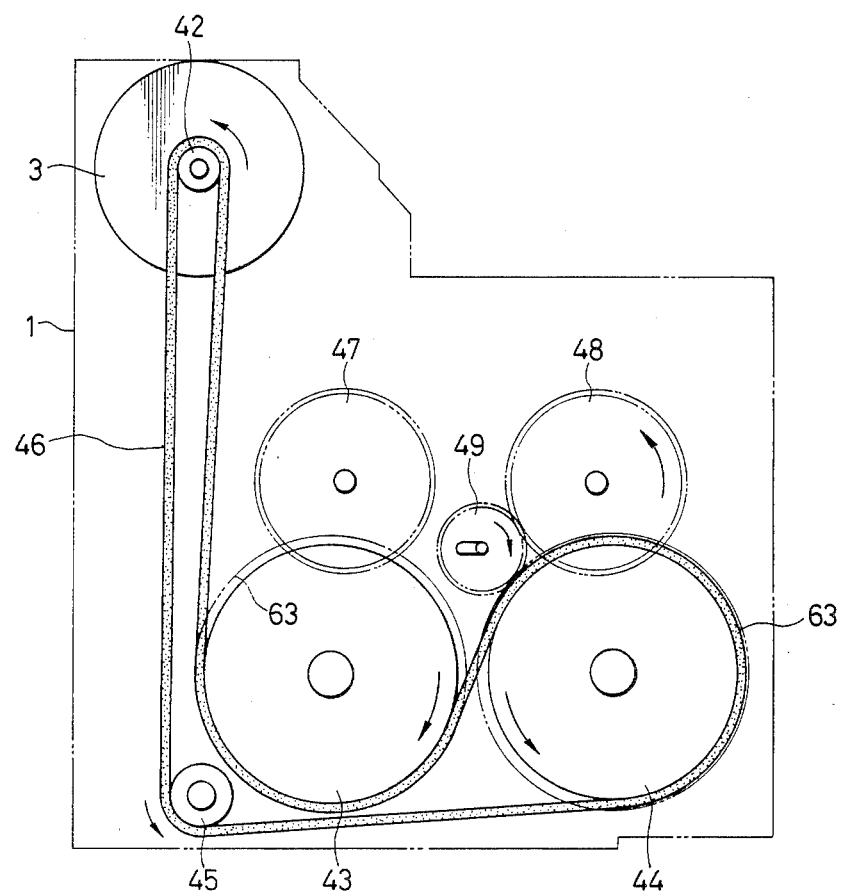
FIG. 9 is a partial bottom view showing a drive force transmission system.

Referring to FIG. 9, a general drive force transmission system of a tape recorder will be explained prior to description of the reproducing mechanism.

A drive pulley 42 is coupled with a rotary shaft of a main motor 3 and an endless belt 46 is entrained about the pulley 42, right and left fly-wheels 43 and 44, and a guide pulley 45 as shown in the drawing. Right and left reel gears 47 and 48 are provided corresponding to the fly-wheels 43 and 44 and an idle gear 49 is provided between the fly-wheel 43 (44) and the reel gear 47 (48) such that it can be somewhat moved right and left (the horizontal direction in the drawing).

Since the belt 46 is entrained as shown in the drawing, the right and left fly-wheels 43 and 44 always rotate in the opposite directions to each other. Each of the fly-wheels 43 and 44 has a spur gear formed at its outer periphery so that it can engage with the idle gear 49.

Under the condition as shown in FIG. 9, the idle gear 49 moves to the right in the drawing and engages with the fly-wheel 44 and the reel gear 48, so that the rotation drive force of the main motor 3 is transmitted to the reel gear 48 through the belt 46, fly-wheel 44, and the idle gear 49, and the reel gear 48 is rotated in the direction to wind up the tape. At this time, the drive force is not transmitted to the reel gear 47.

If the idle gear 49 is moved to the left to engage with the fly-wheel 43 and the reel gear 47, the rotation drive force of the main motor 3 is transmitted to the reel gear 47 through the belt 46, fly-wheel 43, and the idle gear 49, and the reel gear 47 are rotated in the direction to wind up the tape. At this time, the drive force is not transmitted to the reel gear 48.

When the idle gear 49 is in an intermediate position between the fly-wheels 43 and 44, the idle gear 49 does not engage with any of the fly-wheels 47 and 48, so that both the reel gears 47 and 48 are not rotated. The particular movement of the idler gear 49 will be described later in detail.

Figure 10:
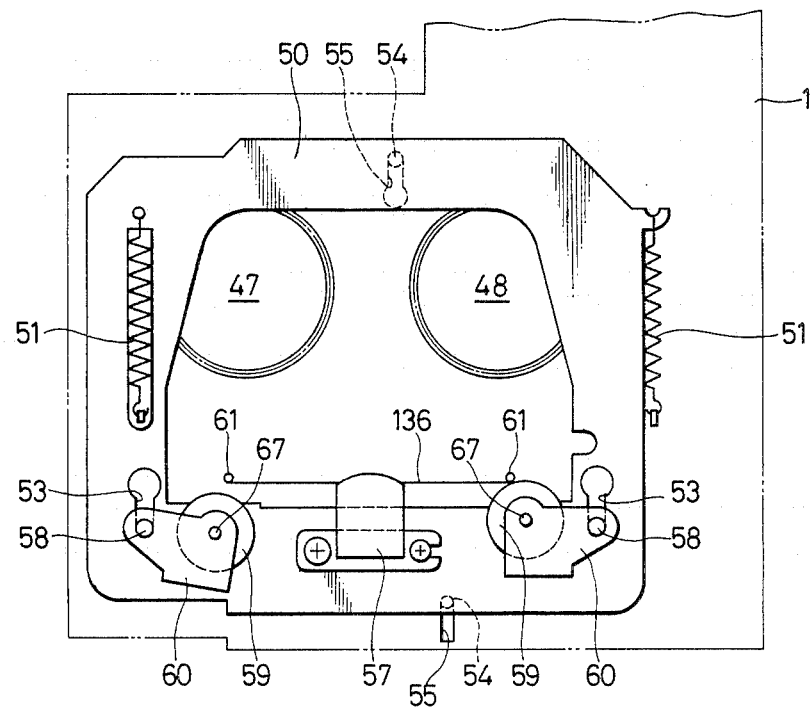
FIG. 10 is a main part plan view in the state of performance or play.

As seen in FIG. 10, a frame-like head base 50 is movably disposed above a chassis 1, and normally pulled into a pause position side (toward the bottom side in the drawing) by two return springs 51 provided in predetermined right and left positions in the drawing.

Figure 12:
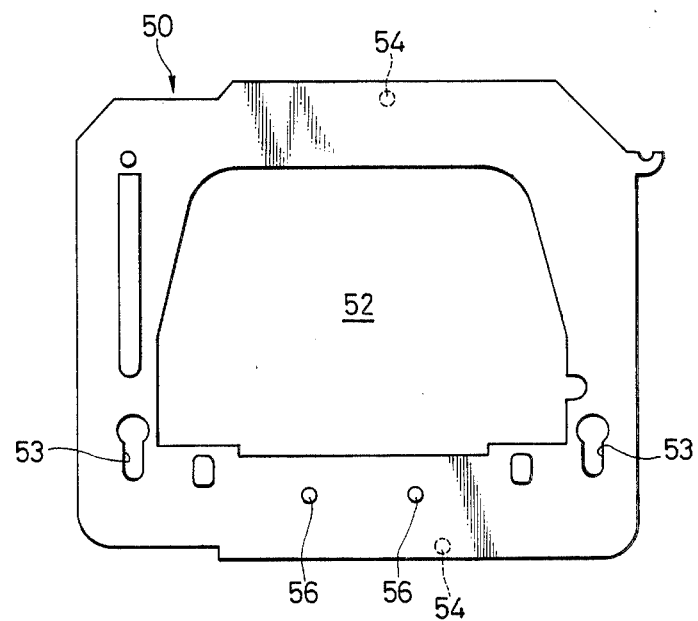
FIG. 12 is a plan view of a head base.

FIG. 12 is a plan view of the head base 50 constituted by a sheet of metal plate. A large opening 52 is formed substantially at the center of the head base 50 and a pair of elongated head base stopper slots 53 are formed on both sides of the opening 52. A pair of pin-like head base guides 54 are provided such that they project from the surface of the head base 50 at predetermined positions (top and bottom sides of the drawing) and inserted into base guide slots 55 formed in the chassis 1 as shown FIG. 10. Reference numeral 56 designates magnetic head attaching holes, and a magnetic head 57 is fixedly attached to the holes toward the opening 52, as seen in FIG. 10.

Figure 13:
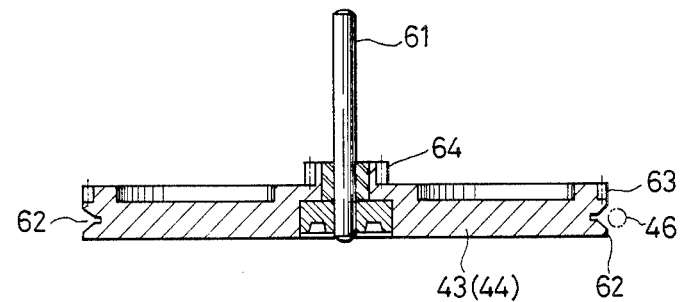
FIG. 13 is a cross-section of a fly-wheel.

Arm axles 58 used also as stopper pins are inserted through the head base stopper slots 53, and pinch roller arms 60 on which pinch rollers 59 are respectively rotatably supported are coupled with the arm axles 58. A pair of capstans 61 are provided corresponding to the right and left pinch rollers 59. The capstan 61 is used also as a rotary shaft for the fly-wheel 43 (44) as shown in FIG. 13. As seen in FIG. 13, an annular V-shaped groove 62 is formed in the outer periphery of the fly-wheel 43 (44) so that the belt 46 is fitted in the groove 62. A fly-wheel large diameter gear 63 and a fly-wheel small diameter gear 64 are provided on the fly-wheel 43 (44).

Figure 14:
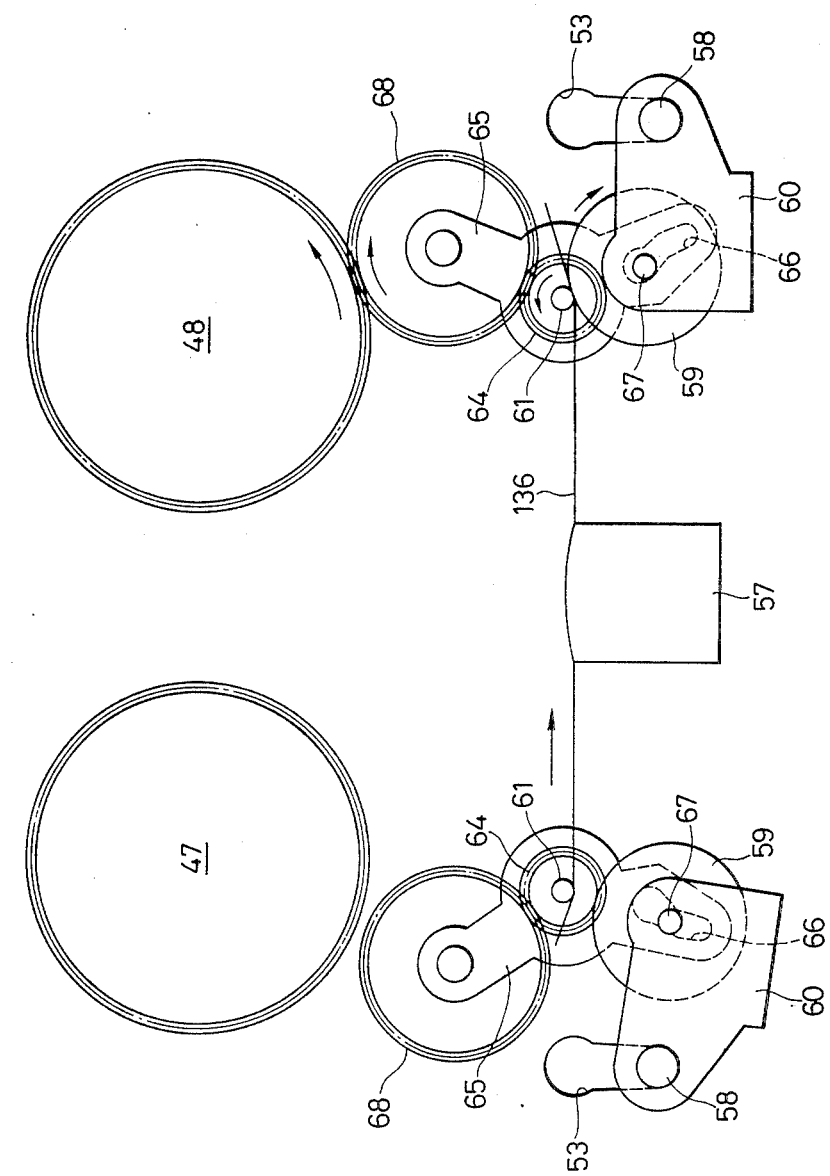
FIG. 14 is an explanatory diagram showing the positional relationship between a pinch roller arm and a pinch lever in the state of performance or play.

As shown in FIG. 14, a pair of pinch levers 65 are rotatably disposed at lower portions of the respective capstans 61. Each pinch lever 65 has an arm portion extending toward the pinch roller 59, and a pinch roller guide slot 66 for changing the position of the pinch roller 59 in accordance with the use mode is formed in the arm portion so that a roller axle 67 for the pinch roller 59 is inserted into the guide slot 66. Each pinch lever 65 has another arm portion extending toward the reel gear 47 (48), and a take-up gear 68, which always engages with the fly-wheel small diameter gear 64 and which can be engaged with the reel gear 47 (48), is rotatably supported on the other arm portion.

A normal/reverse running direction changing-over lever 69 and a head reverse lever 70 are disposed in substantially superimposed relation below the head base 50 on which the magnetic head 57 is attached.

Figure 15:
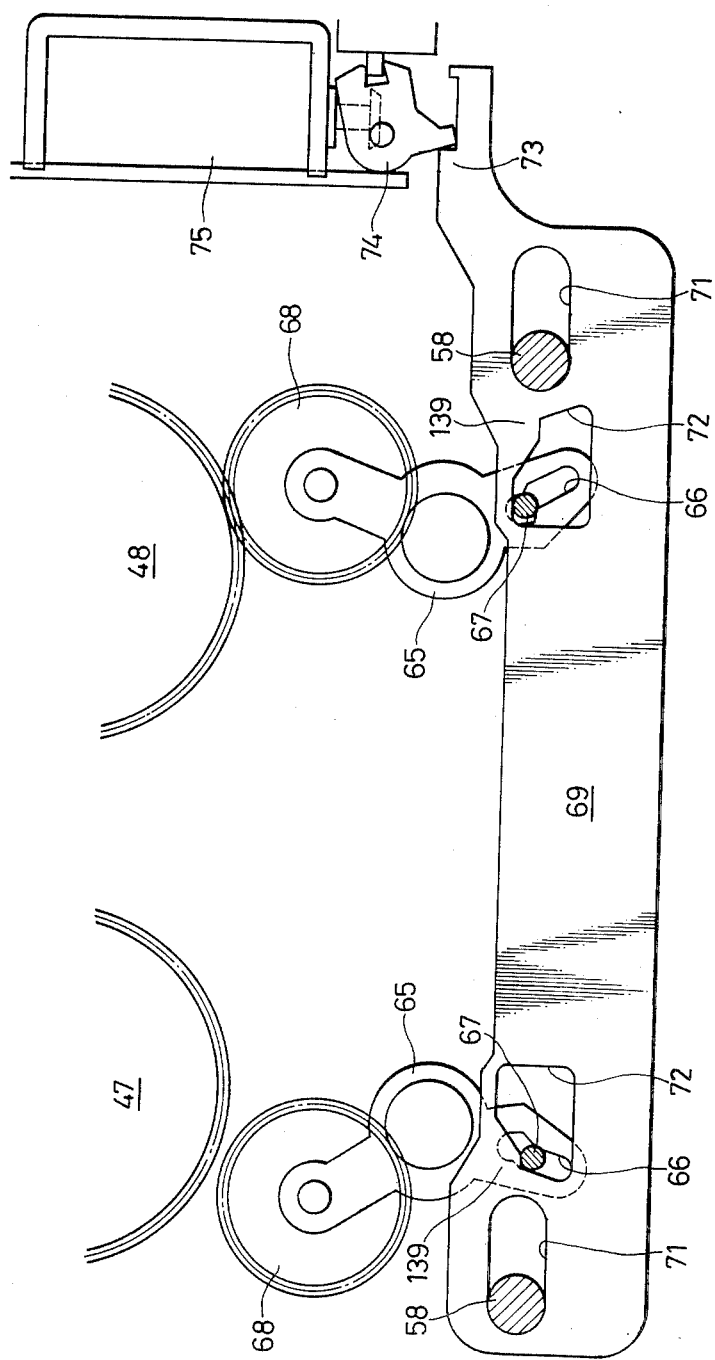
FIG. 15 is an explanatory diagram showing the positional relationship among a pinch roller arm, a roller axle, and a normal reverse running direction change-over lever, in the state of performance or play.

As shown in FIG. 15, a pair of elongated holes 71 are formed in the normal/reverse running direction change-over lever 69 substantially near the opposite ends thereof respectively, and the arm axles 58 are inserted through the holes 71. A pair of substantially trapezoidal holes 72 are bilateral-symmetrically formed in the lever 69 at portions somewhat inside from the pair of elongated holes 71, respectively. The roller axles 67 of the pinch rollers 59 are respectively inserted through the trapezoidal holes 72 with considerable clearance. The trapezoidal holes 72 respectively correspond to the pair of pinch roller guide slots 66 of the respective pinch rollers 65. A drive member engage-stop portion 73 is formed at the right end portion of this change-over lever 69 in the drawing so that the engage-stop portion 73 engages with a switch drive member 74. The switch drive member 74 is rotatably supported and coupled with a position detecting switch. The lever drive solenoid 75 is arranged such that it causes the change-over lever 69 to move alternately toward the right and left ends in the drawing so as to be held thereat every time the drive solenoid is energized.

Figure 16:
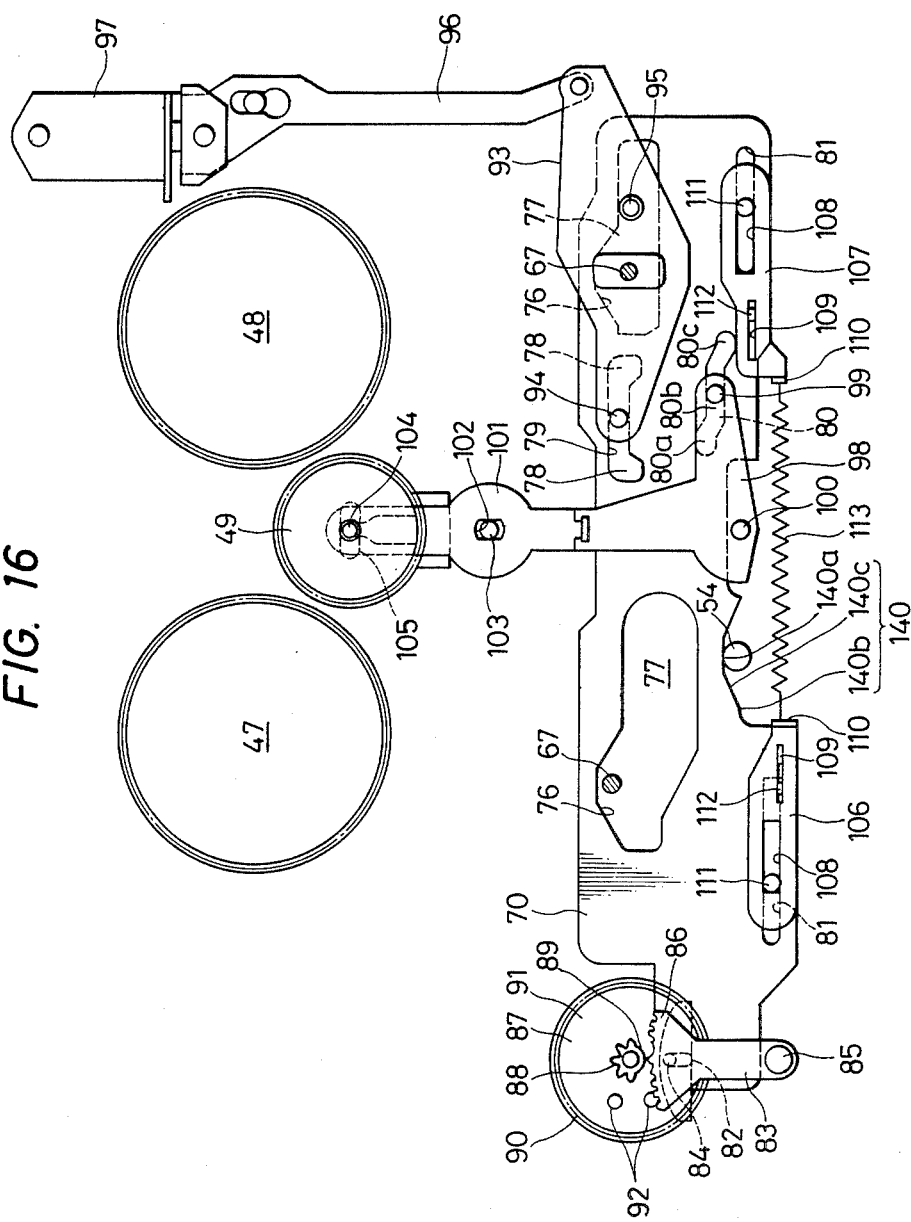
FIG. 16 is an explanatory diagram showing the positional relationship among a head reverse lever and other members in the state of performance or play.

As shown in FIG. 16, a pair of relatively large openings 77 each of which has a mountain-like reverse cam end surface 76 are formed in the head reverse lever 70 at bilaterally symmetrical positions thereof. A lock slot 79 having a pair of lock recess portions 78 formed at the opposite ends thereof is formed in the lever 70 at a position between the pair of openings 77, and a three-stepped idle gear drive cam slot 80 is also formed in the lever 70 in this area of the drawing with respect to the lock slot 79. The idle gear drive cam slot 80 is composed of first, second, and third cam slots 80a, 80b, and 80c, respectively, each linearly extending in the moving direction of the head reverse lever 70. Two slanted cam slots are connected between the first and second cam slots and between the second and third cam slots respectively. The cam slots 80a, 80b, and 80c are for changing the position of the idle gear 49 in a manner which will be described later and for holding it in the changed position. The first, the second, and the third cam slots 80a, 80b, and 80c are formed at the nearest, the intermediate, and the farthest position respectively in the drawing. Alternatively, the first, the second, and the third cam slots 80a, 80b, and 80c may be formed at the farthest, the intermediate, and the nearest position respectively in the drawing.

A pair of elongated guide slots 81 are formed in the lever 70 at the bottom of the drawing with respect to the respective right and left openings 77. The pair of openings 77, the lock slot 79, the idle gear drive cam slot 80, and the pair of guide slots 81 are respectively formed along the longitudinal direction of the head reverse lever 70 so as to allow the displacement of the head reverse lever 70 in the lateral or horizontal direction in the drawing.

In the head reverse lever 70, an allowance slot 82 extending in the direction perpendicular to the longitudinal direction of the lever 70 is formed at the left end thereof in the drawing, and a protrusion 84 of a swing lever 83 is inserted into the slot 82. The swing lever 83 is arranged such that it can swing by predetermined angles about an axle 85 and a deformation teeth portion 86 is formed at a free end portion of the swing lever 83, the shape of which will be described by referring to FIG. 17. This teeth gear portion 86 is generally fan-like shaped, with a central tooth portion 86a formed at a center portion thereof and small tooth portions 86b respectively formed on both sides of the central tooth portion 86a. Ordinarily shaped teeth portions are further formed at the outside of the respective small tooth portions 86b. The small tooth portion 86b has a tooth which is shaped such that a portion which laps over a tooth tip circle of a small diameter gear 88 of an RF gear 87 opposed to the tooth portion accommodates the shape of an ordinarily shaped tooth. The small diameter gear 88 of the RF gear 87 has a toothless portion circumferentially formed over about 180 degrees. A large diameter gear 90 is formed on the RF gear 87 in addition to the small diameter gear 88 so as to transmit the rotation of a FF-RE drive motor (not shown) to the small diameter gear 88.

Above the lock slot 79 of the head reverse lever 70, is a forward end portion of an RF lock lever 93 which is provided with a lock pin 94 projected from the forward end portion and inserted into the lock slot 79. The RF lock lever 93 is arranged to be rotatable about a lever axle 95 and the root portion of the lock lever 93 is connected with an RF lock solenoid 97 through a connection lever 96.

One end of a first substantially L-shaped drive lever 98 is disposed above the idle gear drive cam slot 80, and a drive pin 99 provided at the tip end portion of the one end is inserted into the idle gear cam slot 80. The first drive lever 98 is rotatable about an axle 100, and the other end thereof is connected with a second drive lever 101 in such a manner that the first and second drive levers are bent or curved therebetween. An oval through hole 102 is bored in the second drive lever 101 substantially at the longitudinally middle portion thereof and a stud 103 provided on the chassis 1 and projecting therefrom is inserted into the through hole 102 so that the second drive lever 101 can rotate about the stud 103. The idle gear 49 is rotatably supported on the free end of the second drive lever 101 through a support pin 104. One end of the support pin 104 is inserted into an elongated stopper hole 105.

The idle gear 49 takes one of three positions, depending on the mode, that is a position where the idle gear 49 engages with the left reel gear 47, a position where the idle gear 49 does not engage with any one of the reel gears 47 and 48, and a position where the idle gear 49 engages with the right reel gear 48.

A first and a second inward-urging member 106 and 107 are slidably disposed above the right and left guide slots 81 of the head reverse lever 70. Bilateral-symmetrically with respective to the first and second inward-urging members 106 and 107, a large slit 108, a small slit 109 and a spring hanging protrusion 110 are formed in each of the first and second collecting members. The large slit 108 is disposed above the guide slot 81 and has a length shorter than latter. A stopper pin 111 projecting from the chassis 1 is passed through the guide slot 81 and the large slit 108. A small protrusion 112 turned up from the head reverse lever 70 is inserted into the small slit 109. A tension spring 113 is hung between the inward-urging members 106 and 107.

A cam surface 140 for reversing the head base 50 is formed in the head reverse lever 70 substantially at a central position in the end surface of the lever 70 on this side. The cam surface 140 is constituted by a performance position cam surface 140a, a sensing position cam surface 140b, and a slanted cam surface 140c connecting both the cam surfaces 140a and 140b. The head base guide 54 projecting from the head base 50 is in contact with the cam surface 140.

Figure 18:
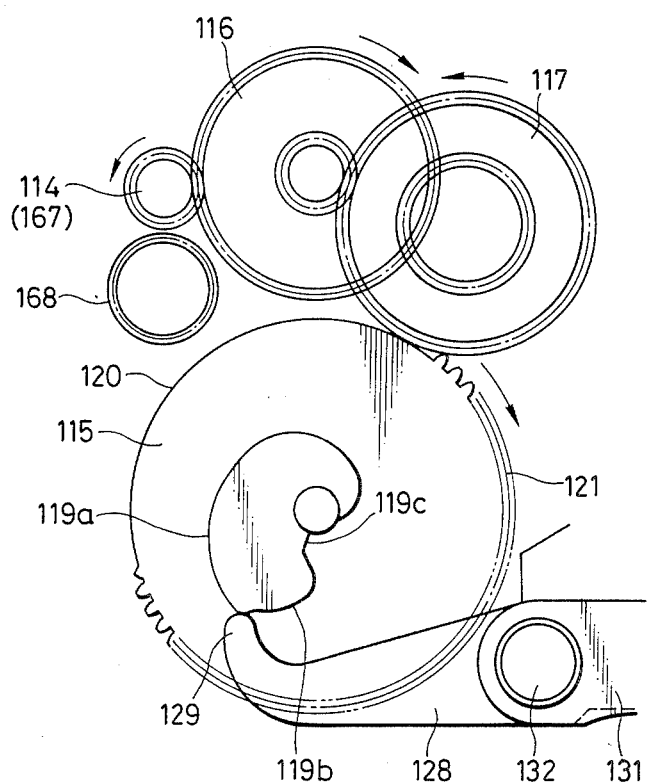
FIG. 18 is an explanatory diagram illustrating a drive force transmission system from a drive gear to a control rotary member.

FIG. 18 is an explanatory diagram illustrating a drive force transmission system from a drive gear 114 to a control rotary member 115. The drive gear 114 is formed integrally with the drive pulley 42 (see FIG. 9) and rotated by the main motor 3 in the direction of arrow. A transmission gear 167 fixedly supported on a rotary shaft 166 of the main motor 3 (see FIGS. 34 and 36) is arranged below the drive gear 114. A cut-off gear 168 is provided in the vicinity of the drive gear 114 and the transmission gear 167 such that the cut-off gear 168 is movable between two positions where it engages with and does not engage with the gears 114 and 167. The transmission gear 167 can engage with a first idler 116 which can engage with a second idler 117 which in turn can engage with the control rotary member 115. Thus, the rotary force of the main motor 3 is transmitted to the control rotary member 115 through the drive gear 114, the transmission gear 167, the cut-off gear 168, and the first and second idlers 116 and 117, so that the control rotary member 115 is rotated in the direction of the arrow.

Figures 19A, 19B:
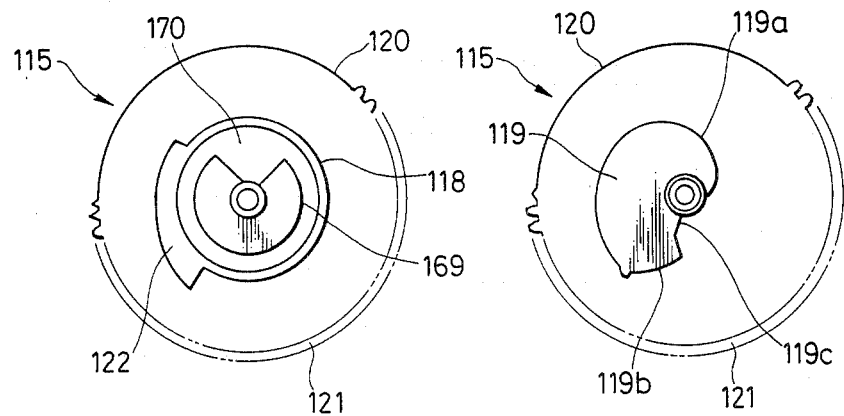
FIGS. 19(a) and 19(b) are plan and bottom views, respectively, of the control rotary member.

FIGS. 19(a) and 19(b) are a plan and a bottom view, respectively, of the control rotary member 115. On the upper surface of the control rotary member 115, an annular portion 118 and a inner cam member 169 are integrally provided with the control rotary member 115 such that it projects therefrom as shown in FIG. 19(a), and on the lower surface of the control rotary member 115, a rotation cam 119 is integrally formed such that it projects therefrom as shown in FIG. 19(b). A spur gear portion 121 partly having a toothless portion 120 is formed at an axially intermediate position between the annular portion 118 and and the rotation cam 119 as shown in FIG. 19(a), a fan-like projecting portion 122 is formed at the outer periphery of the annular portion 118 which can engage with a first stop lever depending on the mode as shown, for example, in FIG. 33. A fan-like slot portion 170 is formed in the inner cam member 169.

As shown in FIG. 19(b), the rotation cam 119 is circumferentially provided with a spiral rotation cam surface 119a, a return cam surface 119b connected with the spiral cam surface 119a, and a recess cam surface 119c formed between the terminating end of the return cam surface 119b and the initiating end of the spiral rotation cam surface 119a nearest to the center of rotation.

Figure 20:
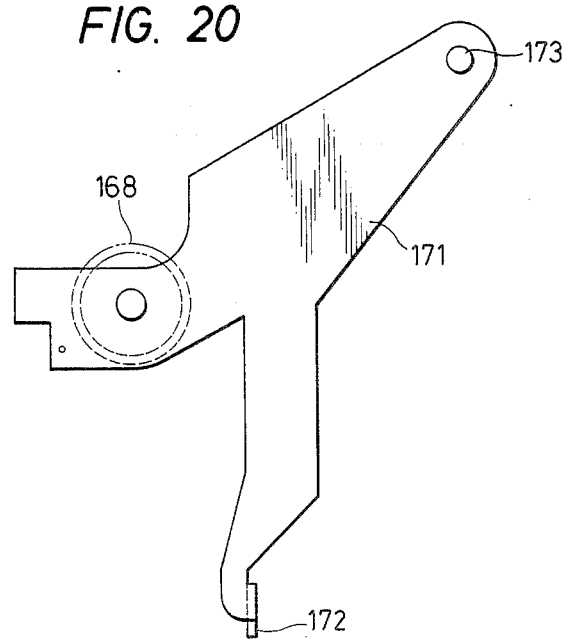
FIG. 20 is a plan view of a cut-off lever.
Figure 33:
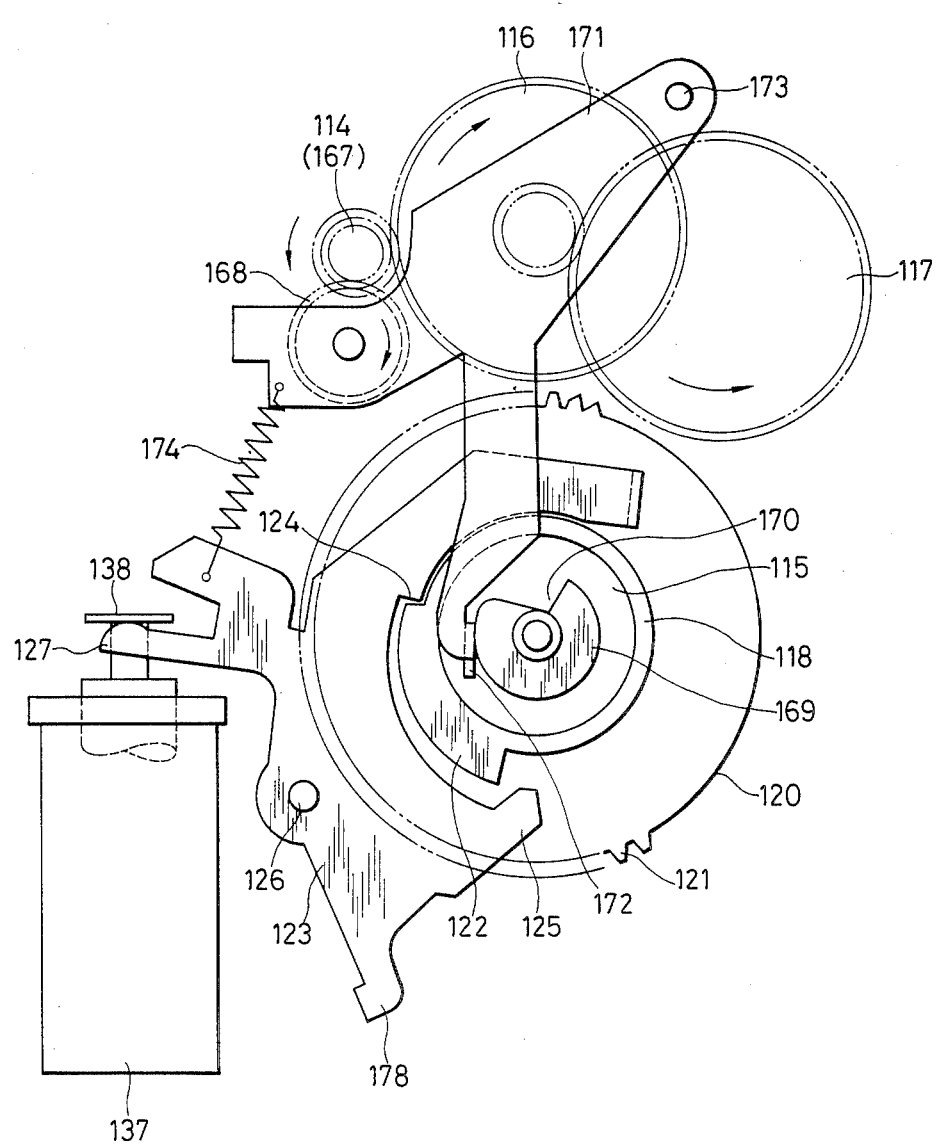
Figure 34:
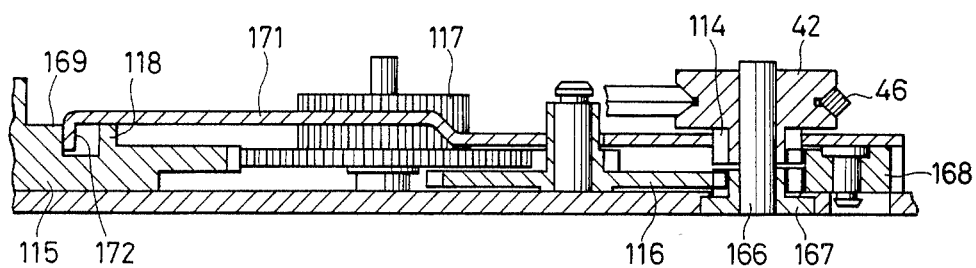

FIG. 20 is a plan view of a cut-off lever 171 on which the cut-off gear 168 is rotatably supported. The cut-off lever 171 is substantially forked into two branches, the cut-off gear 168 being supported on the free end of one branch and a hang-down portion 172 being formed on the free end of the other branch. The cut-off lever 171 can be rotated about a support pin 173. The cut-off lever 171 is thus arranged and the cut-off gear 168 is located in the vicinity of the drive gear 114 and the transmission gear 167 so that the cut-off gear 168 can engage with the gears 114 and 167, as shown in FIGS. 33 and 34. The hang-down portion 172 is arranged such that it can come into contact with the inner cam member 169 of the control rotary member 115. A tension spring 174 is provided between the free end at which the cut-off gear 168 is supported and the first stop lever 123 so that the the cut-off lever 171 is linked with the first stop lever 123.

Figure 37:
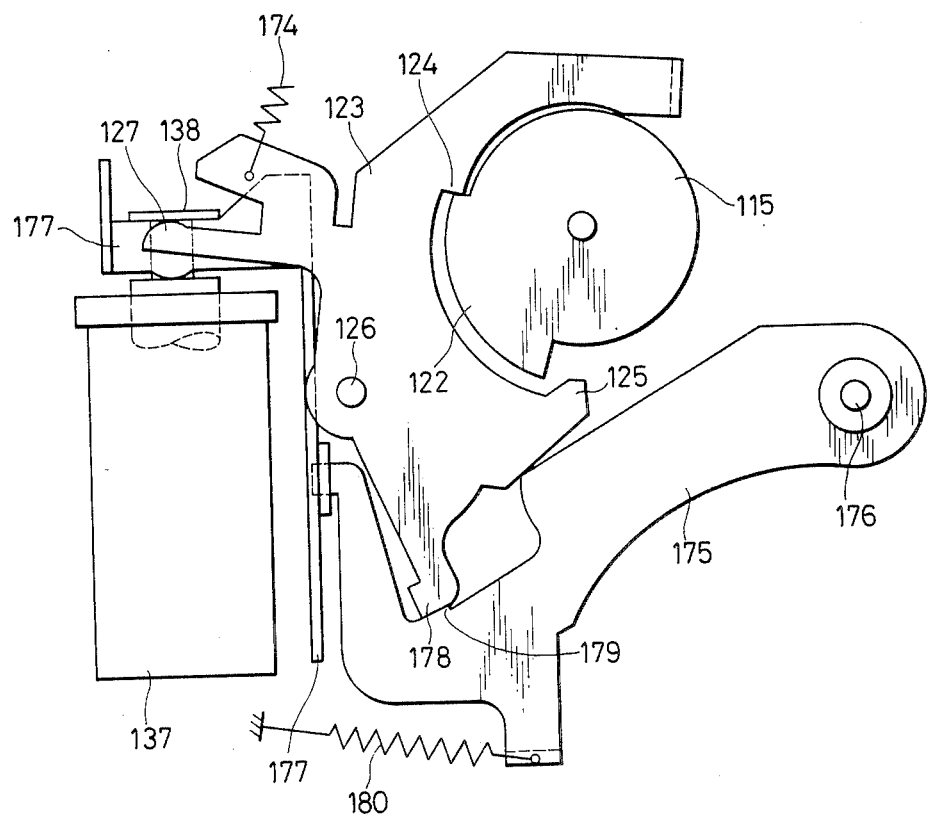
Figure 38:
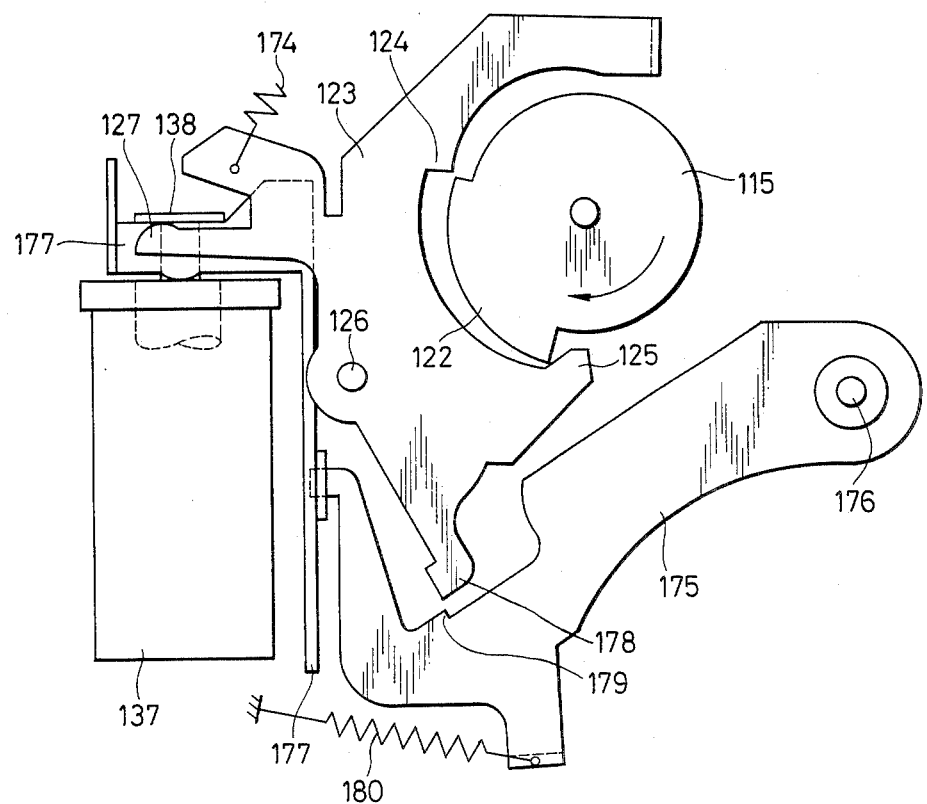

The first stop lever 123 is arranged to rotate about an axle 126 as shown in FIGS. 33 and 37 and supplied by the tension spring 174 with a moment to always cause the lever 123 to rotate clockwise. The free end portion of the first stop lever 123 is shaped so as to surround the annular portion 118 of the control rotary member 115, and a stop step portion 124 and a stop click 125 are formed at one and the other side of the free end portion. A solenoid connection portion 127 is formed at the opposite side to the stop step portion 124 and the stop click 125 such that the solenoid connection portion 127 can engage with an actuator 138 of a stop lever rotation solenoid 137.

As shown in FIGS. 37 to 41, a second stop lever 175 is rotatably supported by an axle 176 in the vicinity of the first stop lever 123. The second stop lever 175 is connected with the actuator 138 of the stop lever rotation solenoid 137 through a lock release lever 177. A step portion 179 which engages with a lever engage-stop portion 178 of the first stop lever 123 is formed in the midway portion of the second stop lever 175. The second stop lever 175 is always clockwise elastically urged by a tension spring 180.

Figure 21:
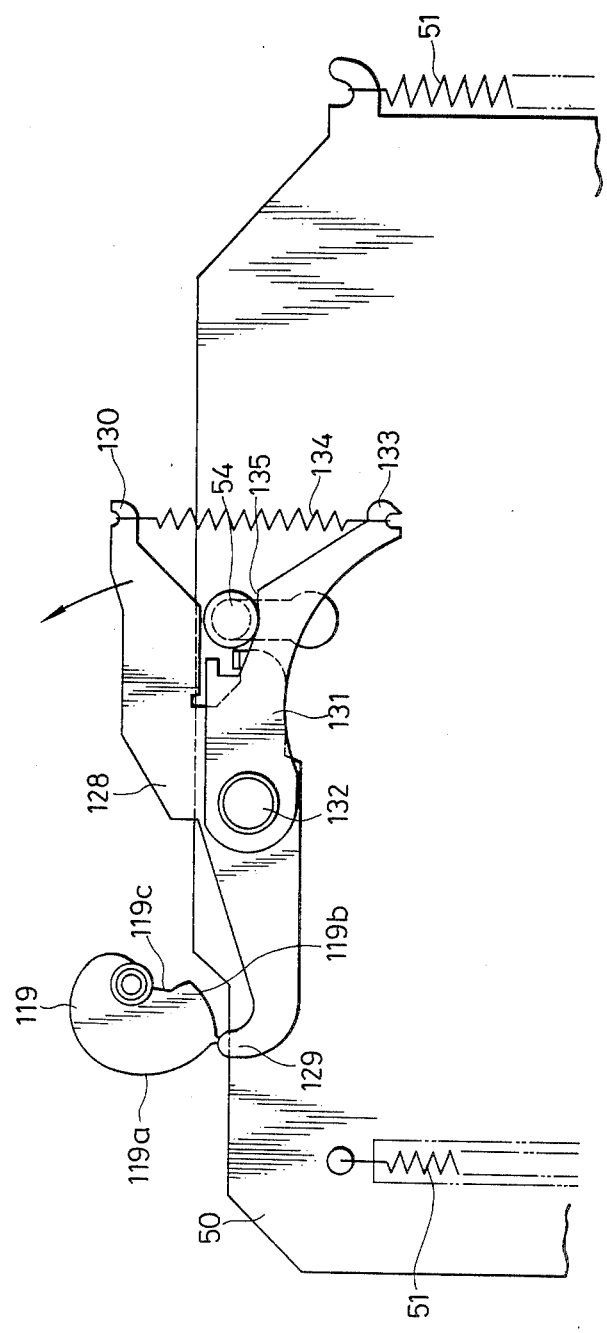
FIG. 21 is an explanatory diagram for explaining the operation of a rotary cam, a first and a second base advancing lever.

As shown in FIG. 21, a cam contacting portion 129 of a first base advancing lever 128 is always in contact with the cam surface of the rotary cam 119. A spring hang portion 130 is provided on the side opposite to the cam contact portion 129 of the first base advancing lever 128. A second base advancing lever 131 is mounted on the first base advancing lever 128. The first and second base advancing levers 128 and 131 are arranged to be rotatable about an axle 132. A spring hang portion 133 is provided at the free end of the second base advancing lever 131 and a tension spring 134 is stretched between the spring hang portions 130 and 133 of the first and second base advancing levers 128 and 131 respectively. The second base advancing lever 131 has, at its middle portion, a contact portion 135 which is urged by the spring force of the tension spring 134 to contact always with the head base guide 54 provided on and projecting from the head base 50.

The states of the respective portions before performance will be first briefly described prior to the description of the operations from the time when the tape cassette 6 has been loaded at its performance or play position to the time when it is reproduced.

Figure 24:
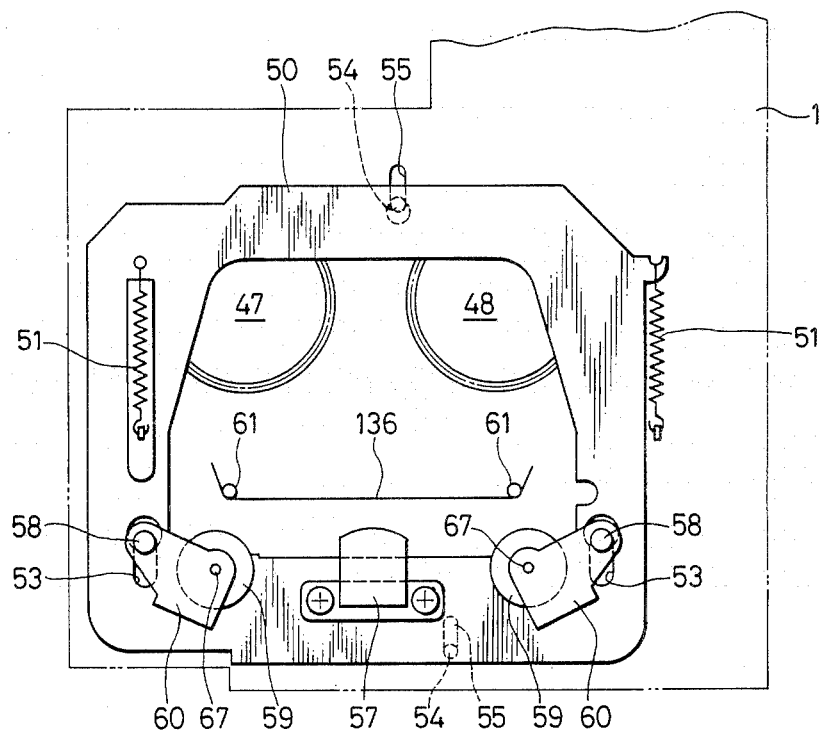
FIG. 24 is a main part plan view in a fast-forwarding-/rewinding state.

The head base 50 is located in the nearest position from the side as shown in FIG. 24, the right and left pinch rollers 59 being separated from the respective capstans 61 and the magnetic head 57 also being separated from a magnetic tape 136. Further, like FIG. 26, the cam contact portion 129 of the first base advancing lever 128 has reached the recess cam surface 119c of the rotation cam 119 and therefore the respective free ends (spring hang portions 130 and 133) of the first and second levers 128 and 131 stand still at the nearest positions to the reel gears 47 and 48 respectively.

In this state, in FIGS. 33 and 34, the hang-down portion 172 of the cut-off lever 171 is held in the position where it is in contact with the inner cam member 169 of the control rotary member 115, so that the cut-off gear 168 engages with drive gear 114 and the transmission gear 167. Although the control rotary member 115 is elastically urged by urging means (not shown) to rotate in the clockwise direction, the fan-like projection portion 122 of the control rotary member 115 engages with the stop step portion 124 of the first stop lever 123 to thereby prevent the control rotary member from rotating. The control rotary member 115 is held in the state immediately before the starting end side of the spur gear portion 121 as the control rotary member 115 engages with the teeth portion of the second idler 117.

In this stand-by state, as shown in FIG. 37, the lever engage-stop portion 178 of the first stop lever 123 is not engaging with the step portion 179 of the second stop lever 175.

As described above as to the cassette loading mechanism, the insertion/removal lever 25 and the ejection lever 29 move as the tape cassette 6 is inserted, and the movement of either one of the levers 25 and 29 is mechanically or optically detected to turn-on the main switch 2 (see FIG. 1). The main motor 3 begins to rotate in response to an on-signal and the stop lever rotating solenoid 137 is energized for a short time, By this energization, the actuator 138 is instantaneously pulled, the first stop lever 123 is thereby counterclockwise rotated, the engagement between the stop step portion 124 and the fan-like projecting portion 122 is thereby released, and the starting end side of the spur gear portion 121 at the control rotary member 115 engages with teeth portion of the second idler 117. The energization of the stop lever rotating solenoid 137 releases the engagement between the stop step portion 124 and the fan-like projecting portion 122 and is therefore ended in a short time.

Although the cut-off lever 171 is pulled by the tension spring as the first stop lever 123 rotates, the hang-down portion 172 of the cut-off lever 171 is in contact with the peripheral surface of the inner cam member 169 to prevent the rotation of the cut-off lever 171, and the state of engagement of the cut-off gear 168 with the drive gear 114 and the transmission gear 167 is thereby maintained. Thus, the rotation force of the main motor 3 is transmitted to the control rotary member 115 through the drive gear 114, the cut-off gear 168, the transmission gear 167, and the first and second idlers 116 and 117, so that the control rotary member 115 is rotated in the clockwise direction.

Although the second stop lever 175 is counterclockwise rotated against the elasticity of the tension spring 180 in response to the instantaneous pulling of the actuator 138 through the lock release lever 177, the lever engage-stop portion 178 merely separates from the step portion 179 and there is no connection with the operation per se.

In response to the rotation of the control rotary member 115, the cam contact portion 129 of the first base advancing lever 128 comes to the rotation cam surface 119a from the recess cam surface 119c and slides on the spirally spread rotation cam surface 119a. In response to this slide, the first base advancing lever 128 is counterclockwise rotated about the axle 132 as shown in FIG. 21 and the second base advancing lever 131 is pulled by the tension spring 134 so as to be rotated also in the same direction as the first base advancing lever 128. The rotation of the second base advancing lever 131 causes, through the head base guide 54, the head base 50 to advance against the elasticity of the return spring 51.

When the terminating end side of the spur gear portion 121 at the control rotary member 115 comes off from the second idler 117 as shown in FIG. 18, the cam contact portion of the first base advancing lever 128 is in contact with the terminating end of the rotation cam surface 119a and therefore the head base 50 is in the most advanced position.

Figure 39:
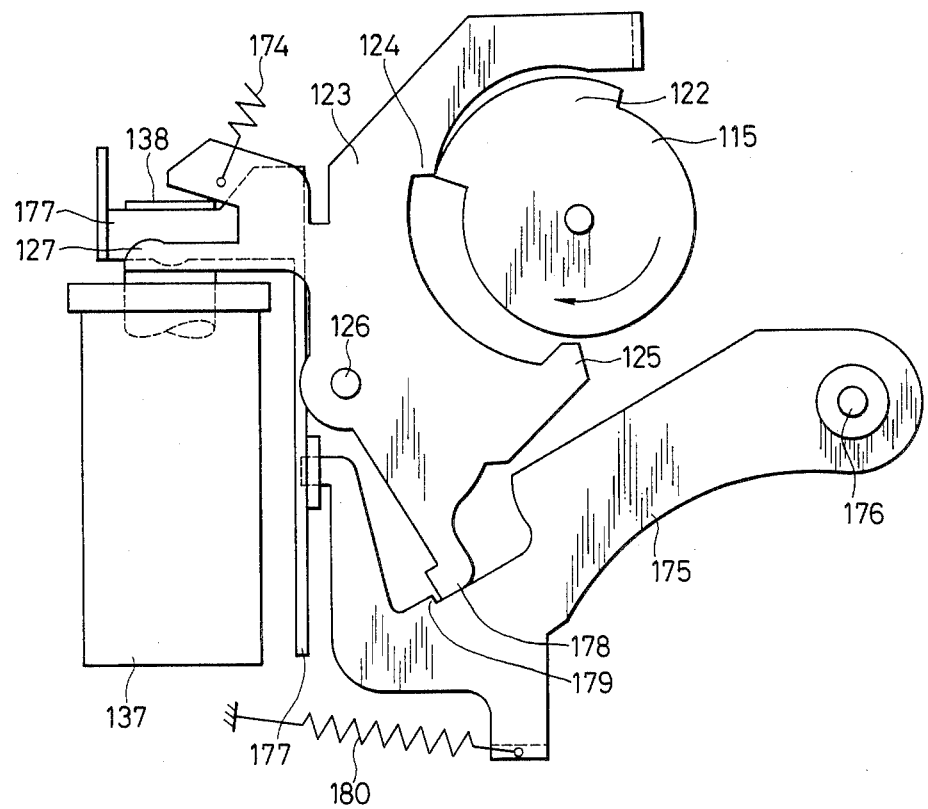

Upon termination of energization of the stop lever rotating solenoid 137, the second stop lever 175 is returned to its initial position by the tension spring 180 to be prepared the engagement with the first stop lever 123. Although the first stop lever 123 is also pulled by the tension spring 174, the rotation thereof is prevented at the position where it engages with the fan-like projecting portion 122 of the control rotary member 115. The fan-like projecting portion 122 is eccentric from the center of rotation of the control rotary member 115 as shown in the drawing and the downstream side of the fan-like projecting portion 122 in the rotary direction projects radially outwards. Accordingly, as, the control rotary member 115 rotates the first stop lever 123 rotates counterclockwise at the fan-like projecting portion 122. FIG. 39 shows the state where the first stop lever 123 has been most rotated. At this time, the stop click 125 of the first stop lever 123 is on the locus of rotation of the fan-like projecting portion 122 and the lever engage-stop portion 178 comes in the position where it opposes to the step portion 179.

Figure 40:
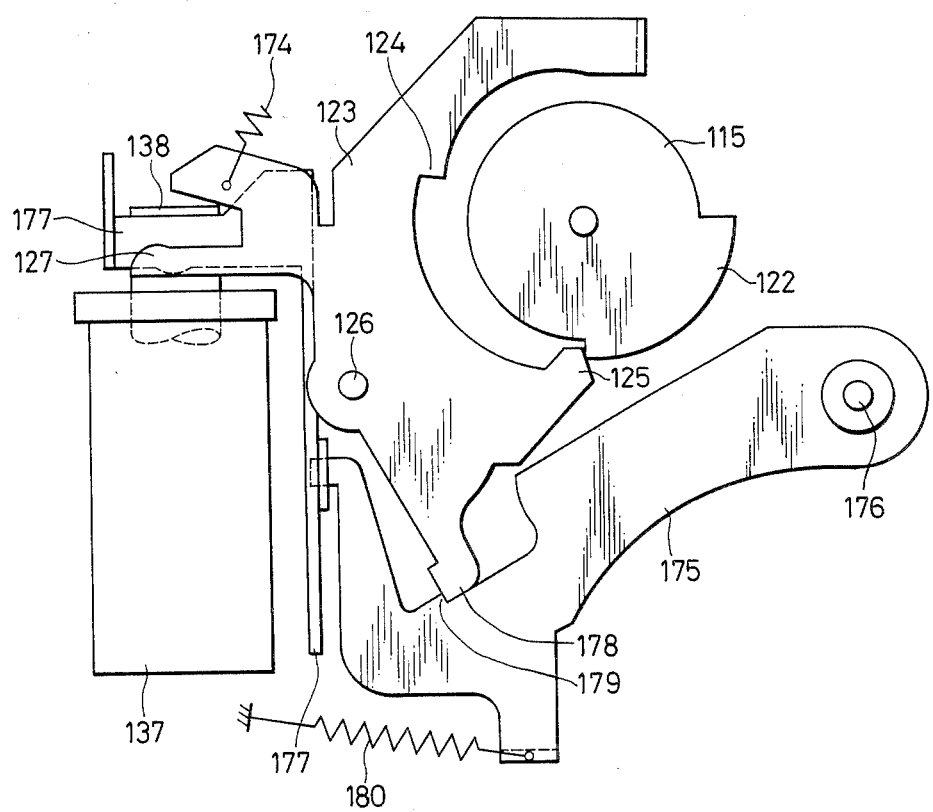
Figure 41:
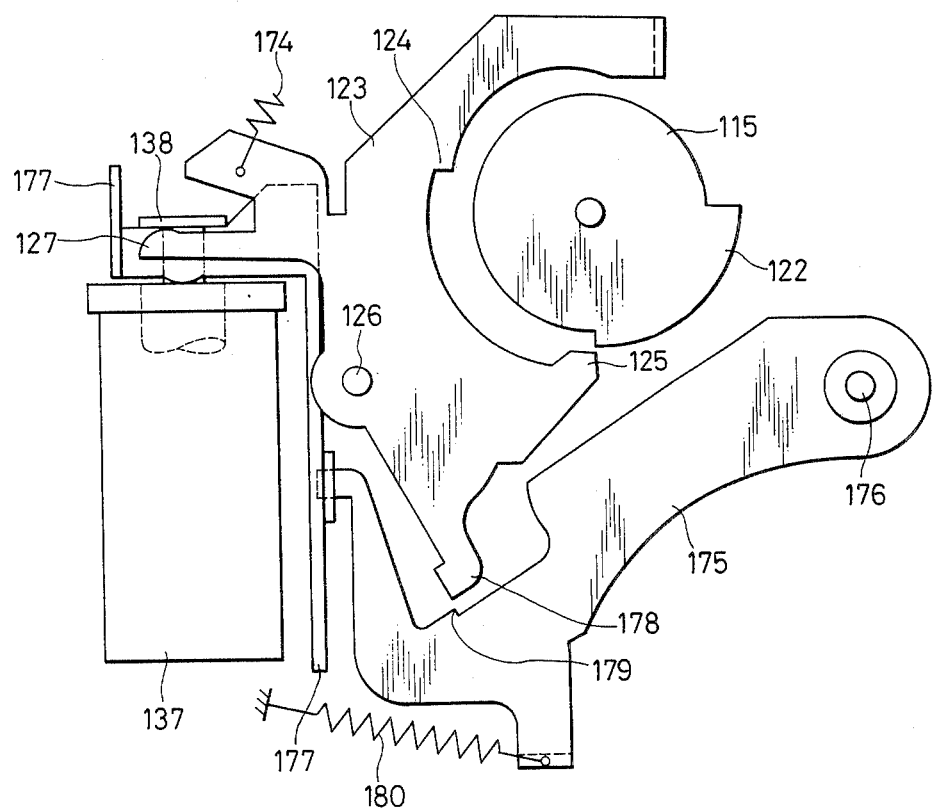

When the control rotary member 115 further rotates from the state of FIG. 39, although the first stop lever 123 is somewhat rotated, it is then prevented from rotating at the position where the lever engage-stop portion 178 engages with the step portion 179 and the first stop lever 123 is locked by the second stop lever 175 (see FIG. 40).

Figure 36:
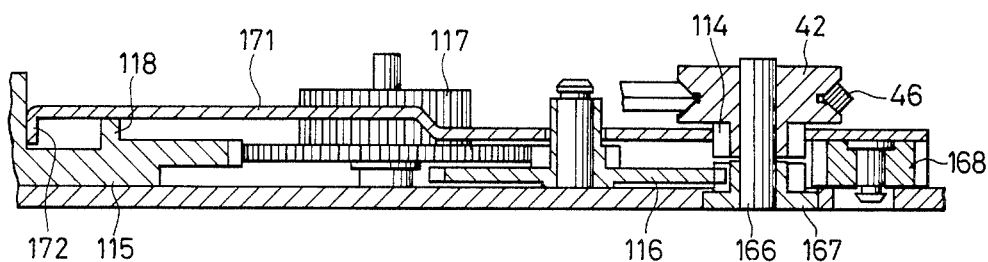
Figure 35:
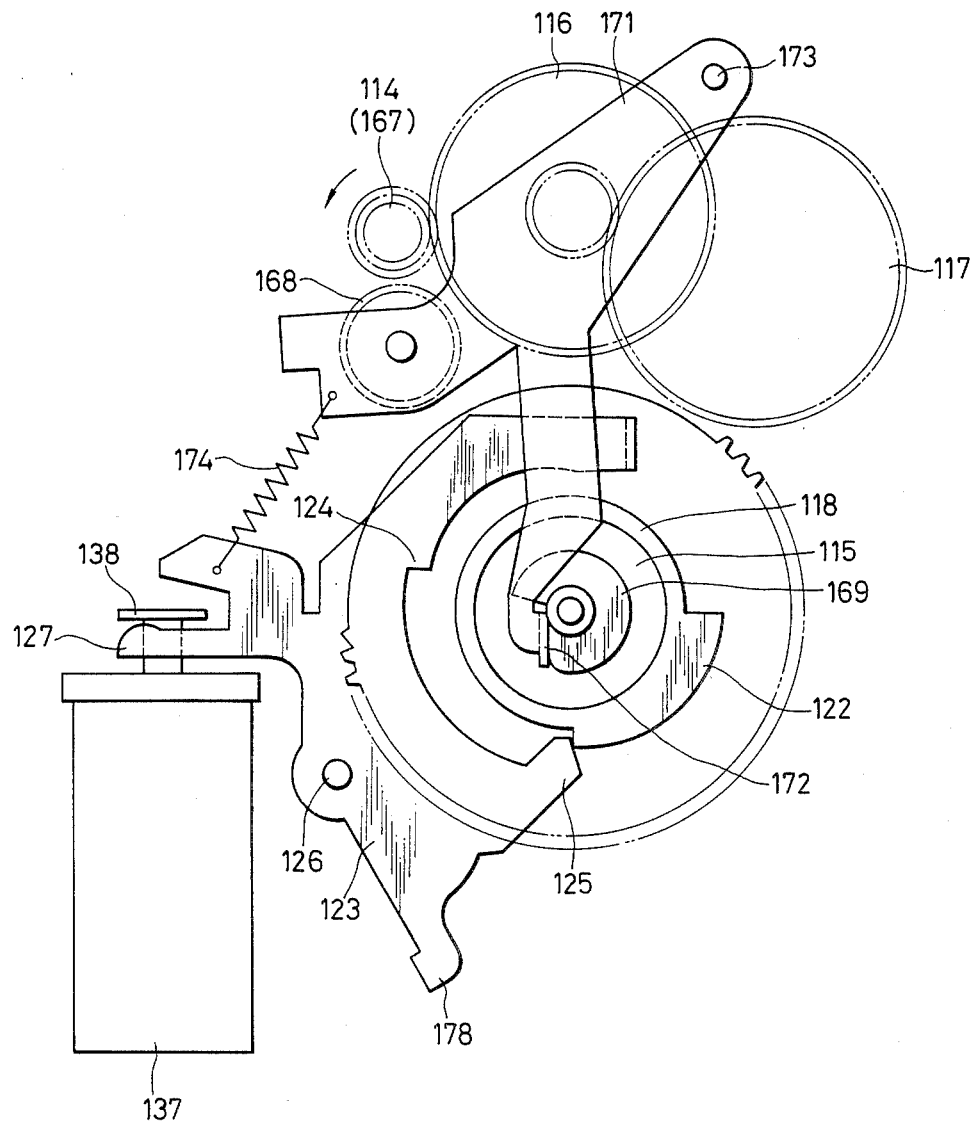

The control rotary member 115 further rotates and the fan-like projecting portion 122 comes into contact with the stop click 125. At this time, the teeth portion of the second idler 117 comes off from the spur gear portion 121 and opposes the toothless portion 120 to release the engagement. The hang-down portion 172 of the first stop lever 123 enters the fan-like slot portion 170 of the inner cam member 169 so that the cut-off lever 171 is counterclockwise rotated by the tension spring 174, thereby allowing the cut-off gear 168 to separate from the drive gear 114 and the transmission gear 167. FIG. 36 shows this state where the cut-off gear 168, the transmission gear 167, and the first and second idlers 116 and 117 stop their rotation to come into their stand-still state. Thus, when the control rotary member 115 is prevented from rotating by the first stop lever 123 and the cut-off lever 171 (see FIG. 35), the cam contact portion 129 is on the terminating end of the rotation cam surface 119a as shown in FIG. 18 and held in this state.

Although the normal/reverse running direction change-over lever 69 can be positioned in either one of the normal or reverse side, assume how it is held in the position as shown in FIG. 15 (normal running side). Accordingly, the roller axle 67 at the left hand in FIG. 15 is in contact with the engage-stop step portion 139 of the left trapezoidal hole 72 in the normal/reverse running direction of change-over lever 69 so that the left pinch roller 59 is separated from the capstan 61 as shown in FIG. 14. Further, the roller axle 67 is in contact with the engage-stop step portion 139 to prevent the left pinch lever 65 from rotating so that the take-up gear 68 supported at one end of the pinch lever 65 is separated from the left reel gear 47 and the drive force can not be transmitted.

At this time, in FIG. 15, the right roller axle 67 is not in contact with the engage-stop step portion 139 of the right trapezoidal hole 72 and has advanced close to the upper edge of the engage step portion 139 so that the magnetic tape 136 is elastically sandwiched between the right pinch roller 59 as shown in FIG. 14, and the capstan 61 and fed in the predetermined direction at a constant speed. Further, the right roller axle 67 is positioned at the end portion of the pinch roller guide slot 66 on the pinch lever 65 side, and the right take-up gear 68 engages with the reel gear 48 through the pinch lever 65, so that the rotation force of the fly-wheel small diameter gear 64 is transmitted to the reel gear 48 through the take-up gear 68 as shown in FIG. 14. Although not shown in the drawing, a reel base is provided above the reel gear 48 and engages with one of the two hubs of the tape cassette 6 to rotate the hub to wind the magnetic tape 136.

The advancement of the head base 50 causes the magnetic head 57 to enter from the head insertion opening (not shown) of the tape cassette 6 by a predetermined depth to come into close contact with the magnetic tape to attain the reproducing operation (see FIGS. 10 and 14).

Figure 11:
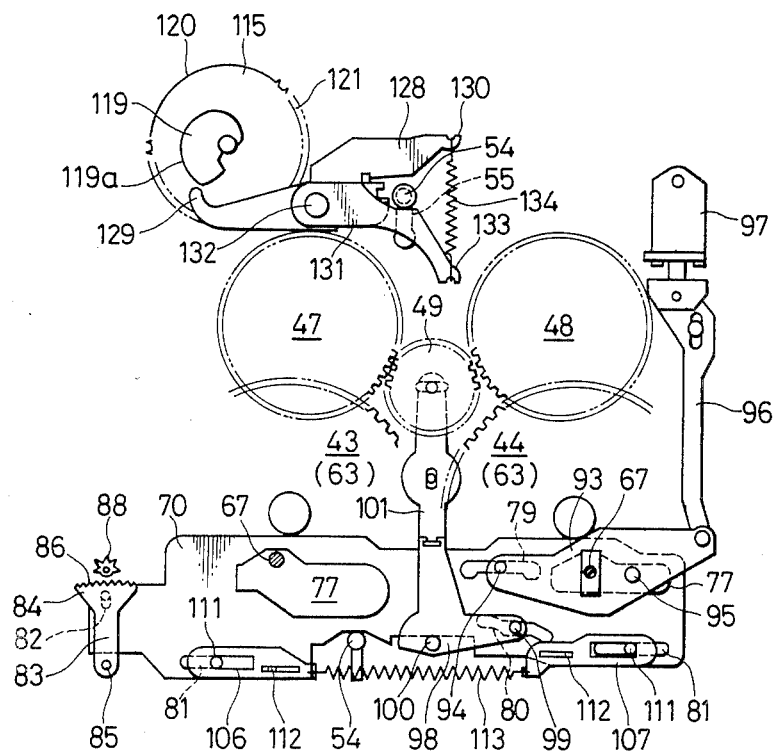
FIG. 11 is a main part bottom view in the state of performance or play.

As shown in FIGS. 11 and 16, when the tape recorder is not used or is in the performance or play mode, the toothless portion 89 of the small diameter gear 88 is in opposition to the teeth portion of the swing lever 83 and there is no engagement relation between the gear 88 and the swing lever 83. As described above, in response to the advancement of the head base 50, the head base guide 54 at this side comes in contact with the performance position cam surface 140a of the cam surface 140 in the head reverse lever 70, and the reverse lever 70 is held in the position as shown in the drawing.

In this state, the lock pin 94 is in the intermediate position of the lock slot 79 and the RF lock solenoid 97 is not yet energized. The drive pin 99 is in the intermediate, second cam slot portion 80b of the idle gear drive cam slot 80 so that one of the arm portions of the first drive lever 98 and the second drive lever 101 are substantially linearly aligned and the support pin 104 is substantially at the central portion of the stopper slot 105. Therefore, as shown in FIG. 11, the idle gear 49 is not in engagement with any of the respective fly-wheel large diameter gears 63 of the right and left fly-wheels 43 and 44 and the right and left reel gears 47 and 48, so that the drive force transmission through the idle gear 49 is not effected.

In this state, performance or reproducing is effected.

Next, the recorded position detecting mechanism will be described hereunder.

(3) Recorded Position Detecting Mechanism

In order to detect a desired music section among a plurality of music sections recorded on a magnetic tape as quickly as possible, it is necessary to separate a pinch roller from a capstan, to rotate a reel (reel gear) at a high speed, and to cause a magnetic head to contact with the magnetic tape. At this time, it is not preferable to place the magnetic head at a position where it is advanced like the performance or play mode, because there occurs excessive abrasion of the magnetic tape and the magnetic head due to the high speed running of the magnetic tape. Accordingly, according to the present invention, the magnetic head is reversed as far as possible within a region where the detection of a recorded signal is not affected, by a mechanism which will be described later, and, further, the slide resistance of the magnetic tape is decreased to a value as small as possible to reduce abrasion between the magnetic tape and the magnetic head as much as possible.

Generally, a music gap detection method is used to detect a recorded portion. In this recorded portion detecting method, a non-recorded region between adjacent music sections on a magnetic tape in which a plurality of music sections are recorded is magnetically detected and when the preceding music has been ended at the detected gap, thereby a succeeding desired music is played from its initial portion.

Figure 17:
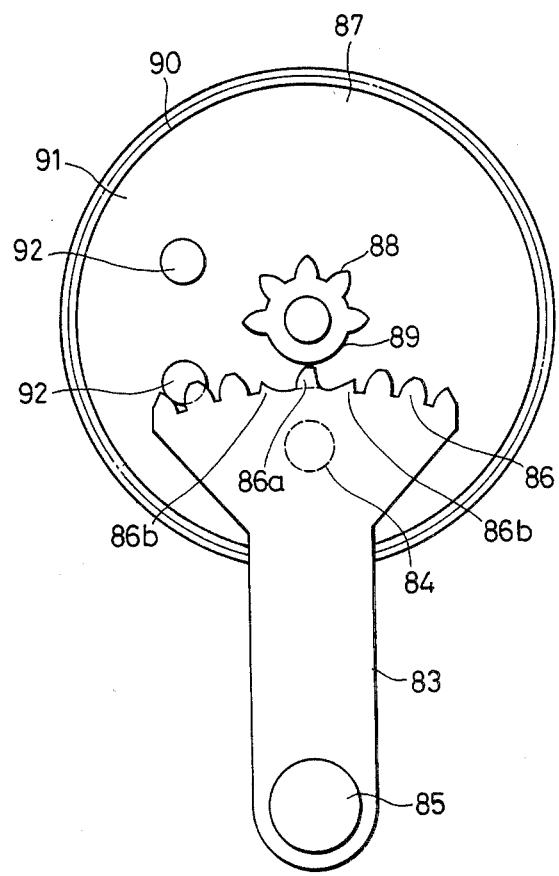
FIG. 17 is an enlarged plan view showing a swing lever and an RF gear.
Figure 22:
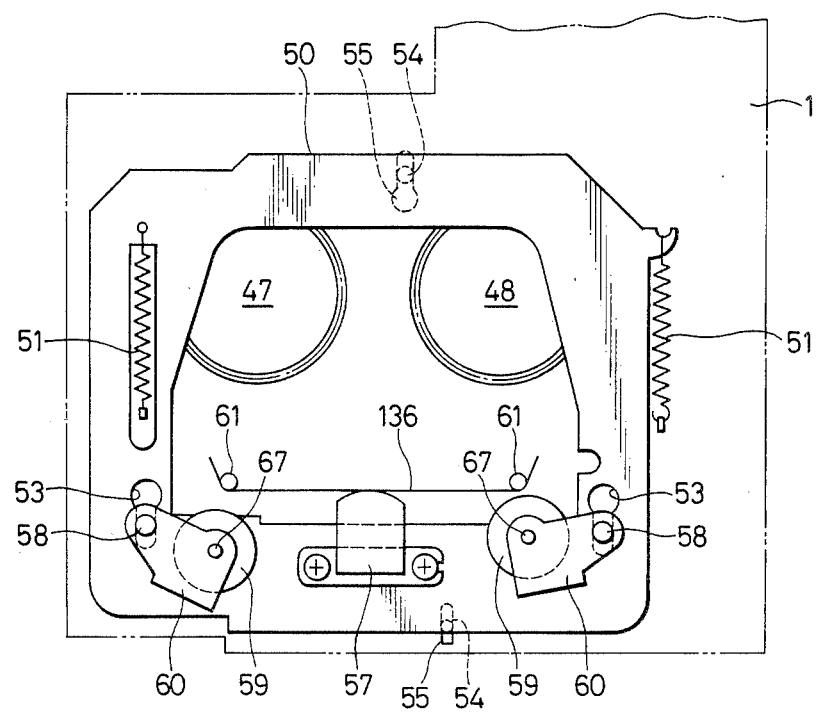
FIG. 22 is a main part plan view in a recorded portion detecting state.
Figure 23:
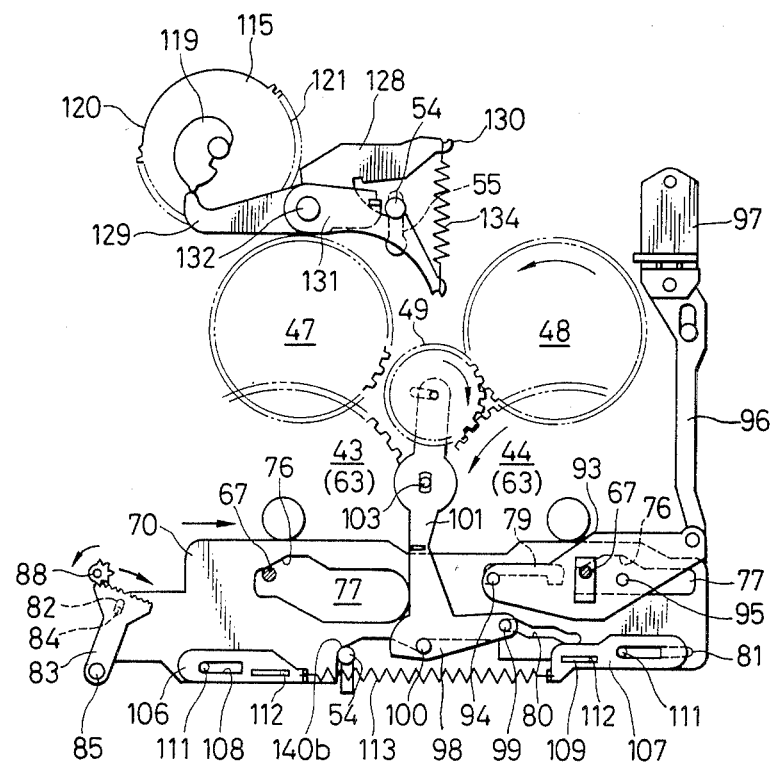
FIG. 23 is a main part bottom view in the same recorded portion detecting state.

FIGS. 22 and 23 show the recorded portion detecting states. Although the toothless portion 89 of the small diameter gear 88 is opposite to the teeth portion 86 of the swing lever 83 as shown in FIGS. 16 and 17 in the performance state described above, the drive force of the motor is transmitted to the RF gear 87 to rotate the RF gear 87, for example, in the counterclockwise direction. Then, the first tooth of the small diameter gear 88 strikes the side surface of the central tooth portion 86a of the swing lever 83 (see FIG. 17) so that the swing lever 83 is somewhat rotated in the clockwise direction, and upon the succeeding rotation, the second tooth of the small diameter gear 88 engages with the small tooth portion 86b to further rotate the swing lever 83 in the same direction. Thus, the swing lever 83 is rotated in the clockwise direction through the engagement between the small diameter gear 88 and the teeth portion 86, and the head reverse lever 70 is displaced right as indicated by the arrow in FIG. 23. Although the head base guide 54 at this side is in contact with the performance position cam surface 140a as shown in FIG. 16 before the head reverse lever 70 is displaced, the slanted cam surface 140c contacts with the head base guide 54 to cause the head base guide 54 to reverse as the head reverse lever 70 moves right. When the reverse lever 70 is displaced to the right side as shown in FIG. 23, the head base guide 54 contacts the sensing position cam surface 140b and is held in this position.

Since the respective head base guides 54 at both sides are connected to the head base 50, when the head base guide 54 at one side is reversed, the head base 50 is also reversed by an amount of the step difference (about 1.5 mm) between the performance position cam surface 140a and the sensing position cam surface 140b to a position, as shown in FIG. 22, in which the magnetic head 57 contacts softly with the magnetic tape 136 so that the magnetic head 54 can still detect a signal recorded on the magnetic tape 136.

As the head base 50 is reversed, the head base guide 54 at the other side is also reversed while causing the the second base advancing lever 131 to rotate in the clockwise direction against the elasticity of the tension spring 134. Since the cam contact portion 129 of the first base advancing lever 128 contacts with the rotation cam 119, the first base advancing lever 128 is left in the performance state even as the second base advancing lever 131 rotates, causing the tension spring 134 to be in the stretched state.

In response to the displacement of the head reverse lever 70, the lock pin 94 fits into one of the lock recess portion 78 of the lock slot 79 (see FIG. 16) as shown in FIG. 23, and thereafter the RF lock solenoid 97 is energized to pull the connection lever 96 to maintain the position of the magnetic head 57 (head base) through the head reverse lever 70.

Since the projecting reverse cam surface 76 is provided in each of the right and left openings 70 of the head reverse lever 70 as described above (see FIGS. 16 and 23), the displacement of the head reverse lever 70 allows the reverse cam end surface 76 to push away the right roller axle to this side. Accordingly, the pinch roller arm 60 (see FIG. 22) is slightly rotated about the roller axle 58 in the counterclockwise direction so that the pinch roller 59 is separated from the magnetic tape 136 as shown in the same drawing. The left pinch roller 59 has been reversed in the performance mode as described above, and therefore it does not move at all even though the head reverse lever 70 is displaced at this time and held in this position.

Since the roller axle 67 is inserted in the slanted pinch roller guide slot 66 as shown in FIG. 15, the right roller axle 67 is pushed away to this side, as described above, to cause the pinch lever 65 to slightly rotate in the clockwise direction, so that take-up gear 68 is separated from the reel gear 48 to cut off the drive transmission to the reel gear 48 to temporarily stop the magnetic tape 136.

Further, the displacement of the head reverse lever 70 as shown in FIG. 23 allows the drive pin 99 to enter the leftmost first cam slot portion 80a of the idle gear drive cam slot 80 (see FIG. 16) so that the first drive lever 98 is slightly rotated about the axle 100 in the counterclockwise direction. Accordingly, the second drive lever 101, which is connected with the first drive lever 98 such that the connection of these levers can be bent or curved at the junction therebetween, is slightly rotated about the stud 103, so that the idle gear 49 is displaced to the right side of the stopper slot 105 to engage with the flywheel large diamter gear 63 of the fly-wheel 44 to rotate the gear 63. Then, the idle gear 49 engages with the right reel gear 48. The operation of engagement between the fly-wheel large diameter gear 63, the idle gear 49, and the reel gear 48 will be described more in detail. Since the oval or elongated through hole 102 is formed in the second drive lever 101 as shown in FIG. 16, the second drive lever 101 is rotated along the through hole 102 while being slightly pulled to this side. Accordingly, the idle gear 49 is rotated in the state of engagement with the fly-wheel large diameter gear 63 at this side, and then engages with the reel gear 48 to rotate at a high speed in response to the successive rotation of the second drive lever 101. Thus, the rotation force of the fly-wheel 44 which is always rotating is transmitted to the reel gear 48 through the idle gear 49 to rotate the reel gear at a high speed to thereby forward the magnetic tape 136 fast to attain a music gap detection in a short time.

The rightward displacement of the head reverse lever 70 allows the right small protrusion 112 to come into contact with the edge of the small slit 109 in the second inward urging member 107 as shown in FIG. 23 to cause the second inward urging member to move right. On the other hand, the edge of the large slit 108 of the left side first inward urging member 106 strikes the stopper pin 111 so that the left side first inward urging member 106 is prevented from moving right/left. Since the first inward urging member 106 is prevented from moving by the stopper pin 111 and the second inward urging member 107 is displaced by the small protrusion 112, the tension spring 113 is stretched to give a centrally return force (inward urging force) to the head reverse lever 70, but the return of the head reverse lever 70 is prevented by the insertion of the lock pin 94.

When a music gap is detected in the state as shown in FIGS. 22 and 23, the RF lock solenoid 97 is turned off on the basis of a music gap detection signal so that the lock pin 94 comes out of the lock recess portion 78 to release the head reverse lever 70 from its locked state. The head reverse lever 70 is returned to the initial center position by the return force of the tension spring 113, and the head base guide 54 at this side is advanced by the tensile force of the tension spring 134 such that it comes into contact with the performance or play position cam surface 140a from the sensing position cam surface 140b through the slanted cam surface 140c. As the head base guide 54 advances, the head base 50 (magnetic head 57) also advances to the performance or play position.

In response to the return of the head reverse lever 70, the first and second drive levers 98 and 101 rotate to their initial positions so that the idle gear 49 is separated from the reel gear 48 and the fly-wheel large diameter gear 63 and the drive transmission of the reel gear 48 is temporarily stopped.

Further, in response to the return of the head reverse lever 70, the pressing force applied onto roller axle 67 by the reverse cam end surface 76 is eliminated so that the roller axle 67 comes back to the initial position and the magnetic tape 136 is elastically sandwiched between the pinch roller 59 and the capstan 61.

Further, in response to the return operation of the roller axle 67, the pinch lever 65 rotates, the take-up gear 68 engages with the reel gear 48, the real gear 48 begins to rotate, the magnetic tape 136 is taken up, and the selected music is played.

The fast-forwarding/rewinding mechanism will be described next.

(4) Fast-Forwarding/Rewinding Mechanism

In response to a fast-forward signal or a rewinding signal from the control section, the stop lever rotation solenoid 137 shown in FIG. 40 is temporarily energized so that the lock release lever 177 is displaced to rotate the second stop lever 175 against the elasticity of the tension spring 180, and the step portion 179 comes off from the lever engage-stop portion 178 to thereby release the lock of the first stop lever 171. In response to this release of the lock, the first stop lever 123 is rotated to allow the stop click 125 to separate from the fan-like projecting portion 122 to enable the control rotary member to be rotatable.

Since the stop lever rotation solenoid 137 is merely temporarily energized, the actuator 138 comes back to its initial position after energization, the first stop lever is thereby rotated in the clockwise direction, and the stop step portion 124 enters the rotation locus of the fan-like projecting portion 122. Being supplied always with clockwise rotation moment, the control rotary member 115 rotates to the position where it comes into contact with the stop step portion 124 when the lock is released and stops thereat to assume the state in FIG. 33.

Figure 25:
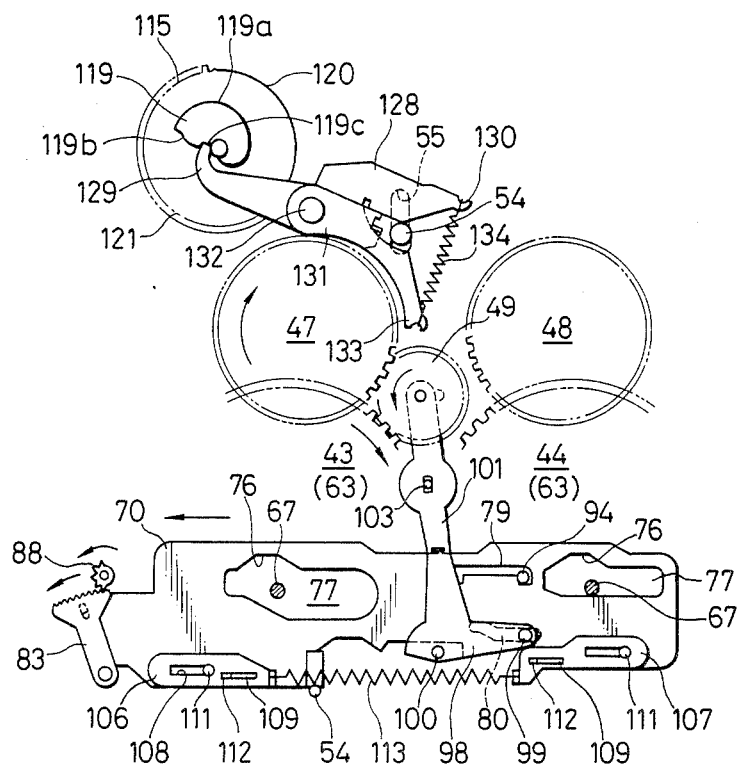
FIG. 25 is a main part bottom view in the same fast-forwarding/rewinding state.

FIGS. 24 and 25 show the fast-forwarding/rewinding state. Since the head base 50 is pulled always toward this side by the return spring 51, the cam contact position 129 enters the recess cam surface 119c through the return cam surface 119b (see FIG. 25) in response to the rotation of the rotation cam 119, resulting in the clockwise rotation of the first and second base advancing levers 128 and 131. At the same time the head base 50 comes back to this side so that the magnetic head 57 and the right and left pinch rollers 59 come off from the magnetic tape 136 and the take-up gear 68 comes off from the reel gear 48 (47) to temporarily stop the running of the magnetic tape 136.

The small diameter gear 88 of the RF gear 87 is rotated on the basis of a fast-forwarding signal or a rewinding signal from the control section. FIG. 25 shows the case in which the small diameter gear 88 of the RF gear 87 is clockwise rotated so that the head reverse lever 70 is moved left to thereby cause the left side reel gear 47 to rotate at a high speed.

That is, the rotation of the small diameter gear 88 causes the swing lever 83 to rotate in the direction of the arrow so that the head reverse lever 70 is pulled left. The right and left roller axles 67 move to this side together with the head base 50 to come off from the reverse cam end surface 76, so that the roller axles 67 do not move in response to the displacement of the head reverse lever 70.

The leftward displacement of the head reverse lever 70 allows the lock pin 94 to enter the right side lock recess 78 of the lock slot 79 so that the position of the head reverse lever 70 is maintained by the energization of the RF lock solenoid 97. In FIG. 25, the RF lock lever 93, the connection lever 96, the RF lock solenoid 97, etc. are omitted for sake of simplicity of the drawing.

As the head reverse lever 70 moves, the drive pin 99 enters the rightmost third cam slot portion 80c of the idle gear drive cam slot 80 so that the respective first and second drive levers 98 and 101 slightly rotate in the clockwise direction about the axle 100 and in the counterclockwise direction about the stud 103 respectively. Accordingly, the idle gear 49 engages first with the fly-wheel large diameter gear 63 of the left side flywheel 43 to be thereby rotated, and then engages with the left side reel gear 47 to perform drive force transmission. By the rotation of the reel gear 47, the magnetic tape 136 is taken up at a high speed.

The leftward displacement of the head reverse lever 70 causes the left side small protrusion 112 to come into contact with the edge of the small slit 109 of the left side first inward urging member 106 so that the first inward urging member 106 is displaced left. Since the edge of the large slit 108 of the right side second inward urging member 107 is in contact with stopper pin 111, the leftward displacement of the right side second inward urging member is prevented, so that a return force to the center is given to the head reverse lever 70 by the stretch of the tension spring 113.

Upon completion of fast-forwarding or rewinding of the magnetic tape 136 in the state as shown in FIGS. 24 and 25, the RF lock solenoid 97 is deenergized in response to a completion signal, and the lock pin 94 comes off from the lock recess portion 78, so that the head reverse lever 70 is released from its locked state. Thus, the head reverse lever 70 is returned to the center by the return force of the tension spring 113 to cause the first and second drive levers 98 and 101 to rotate, to that the idle gear 49 is separated from the reel gear 47 and the fly-wheel large diameter gear 63 to stop the drive transmission of the reel gear 47, that is the high speed running of the magnetic tape 136.

The ejection mechanism will be described next.

(5) Ejection Mechanism

Figure 26:
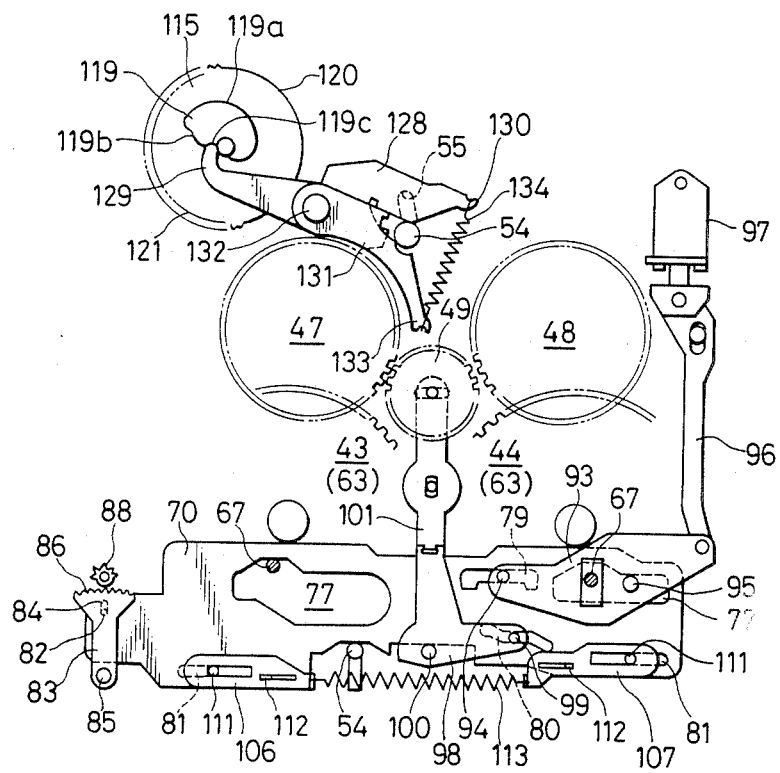
FIG. 26 is a main part plan view in an ejecting state.

Similar to the fast-forwarding/rewinding mode, the control rotary member 115 stops at the position where the fan-like projecting portion 122 engages with the stop click 125 as shown in FIG. 40, also in the ejection mode. Accordingly, as shown in FIG. 26, the cam contact portion 129 of the first base advancing lever 128 enters the recess cam surface 119c of the control rotary member 115, so that head base 50 has come back to the position at this side, the magnetic head 57 and both side pinch rollers 59 have been separated from the magnetic tape 136, and both side take-up gears 68 have been separated from the reel gears 47 and 48 respectively.

The head reverse lever 70 is at the central position so that the idle gear 49 is at an intermediate position between the reel gears 47 and 48 in the state of disengagement with both the reel gears 47 and 48.

Figure 27:
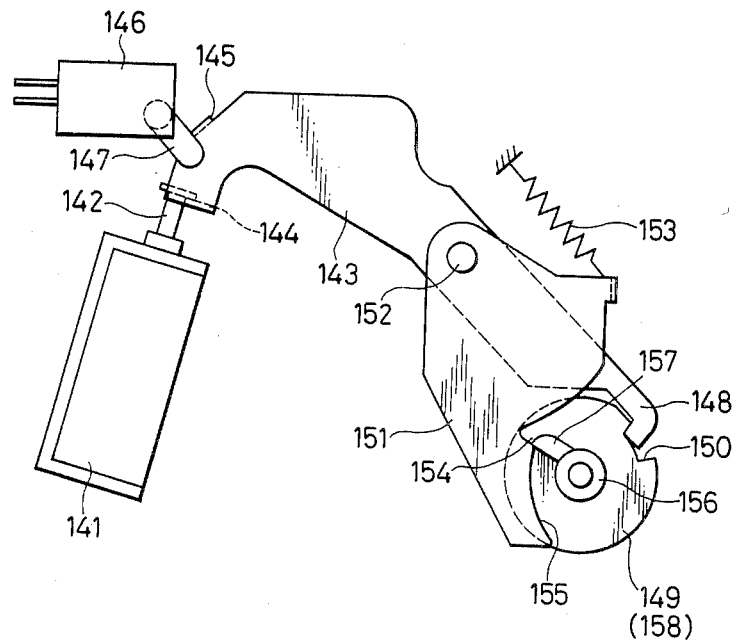
FIG. 27 is an explanatory diagram showing a state of a leaf switch drive mechanism before ejection.
Figure 28:
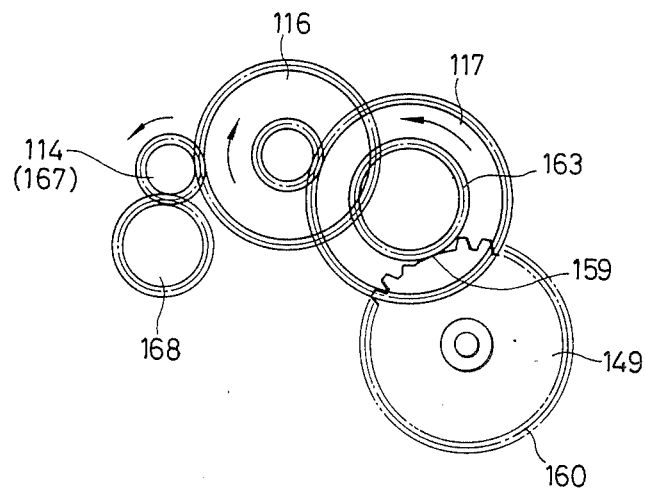
FIG. 28 is an explanatory diagram showing an opposing state of a second idler and an ejection gear before ejection.

FIG. 27 is a diagram showing the state of the leaf switch drive mechanism before ejection and FIG. 28 is a diagram showing the opposition state between the second idler 117 and an ejection gear 149. As shown in FIG. 27, a rear end engage-stop member 144 of a switch lever 143 is removably engaged with an actuator 142 of an ejection solenoid 141. A drive protrusion 145 is provided in the vicinity of the engage-stop member 144 and engages with an operation member 147 of a leaf switch 146. A stopper click 148 is formed at an end of the switch lever 143 and adapted to fit into an engage-stop slot 150 of the ejection gear 149.

A trigger lever 151 is disposed above the switch lever 143, and the root portion of the trigger lever 151 and the intermediate portion of the switch lever 143 are supported by a common axle 152. The trigger lever 151 is always urged rotatably in the counterclockwise direction by a tension spring 153. A pressing slot 154 is formed in the free end portion of the trigger lever 151 and an arc guide edge 155 is formed from the slot 154 to the forward end of the same.

Figure 29A:
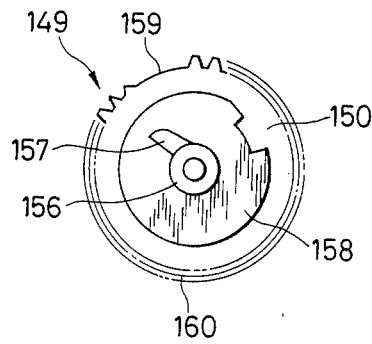
FIGS. 29(a) and 29(b) are plan and bottom views, respectively, of the ejection gear.
Figure 29B:
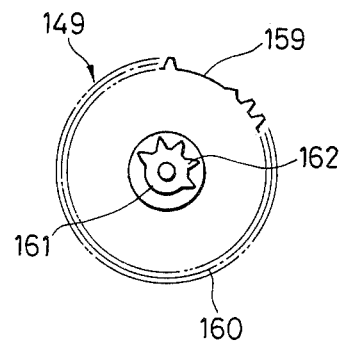

FIGS. 29(a) and 29(b) are a plan and a bottom view of the ejection gear 149. A small cylindrical portion 156 is formed at the upper center portion of the ejection gear 149 and a trigger tooth 157 is formed so as to project radially outward from the peripheral surface of the cylindrical portion 156. A large cylindrical portion 158 is formed under the small cylindrical portion 156 having an engage-stop groove 150 formed in the peripheral surface thereof. A drive teeth portion 160 of the super gear type and partially having a toothless portion 159 is formed under the large cylindrical portion 158. A small diameter teeth portion 162 having a toothless portion 161 is formed under the drive teeth portion 160, that is at the rear side of the ejection gear 149. The drive teeth portion 160 is arranged to be engageable with a small diameter gear 163 of the second idler 117 as shown in FIG. 28. The small diameter teeth portion 162 is arranged to be engageable with rack teeth 164 attached to the side portion of the ejection lever 29 as shown in FIGS. 2, 5 and 31.

Figure 31:
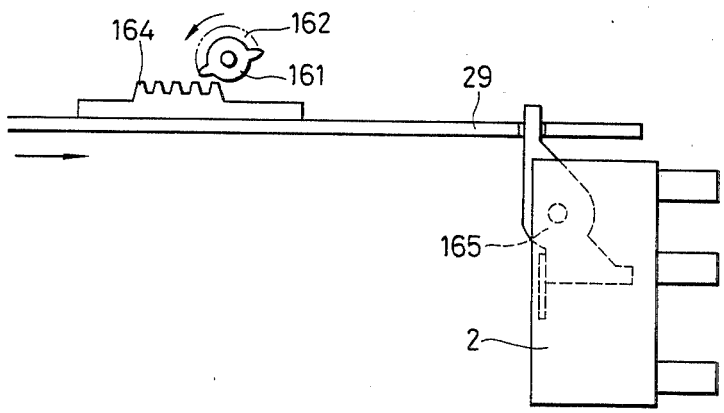
FIG. 31 is an explanatory diagram showing a state of an ejection lever, a rack and a main switch lever before ejection.

A part of the ejection lever 29 engages a main switch lever 165 as shown in FIG. 31 so that the the rotation of the main switch lever 165 turns the main switch 2 on/off.

FIGS. 27, 28 and 31 show the state before ejection. In this state, the ejection solenoid 114 is in its deenergized state, the leaf switch 146 is in its off-state, and the stopper click 148 enters in the engage-stop slot 150, so that the ejection gear 149 is prevented from rotating (see FIG. 27). Further, as shown in FIG. 28, the toothless portion 159 of the ejection gear 149 is in opposition to the small diameter gear 163 of the second idler 117 so that the drive force is not transmitted from the main motor 3 (drive gear 114). Furthermore, as shown in FIG. 31, the toothless portion 161 of the small diameter teeth portion 162 is in opposition to the rack teeth 164.

Figure 30:
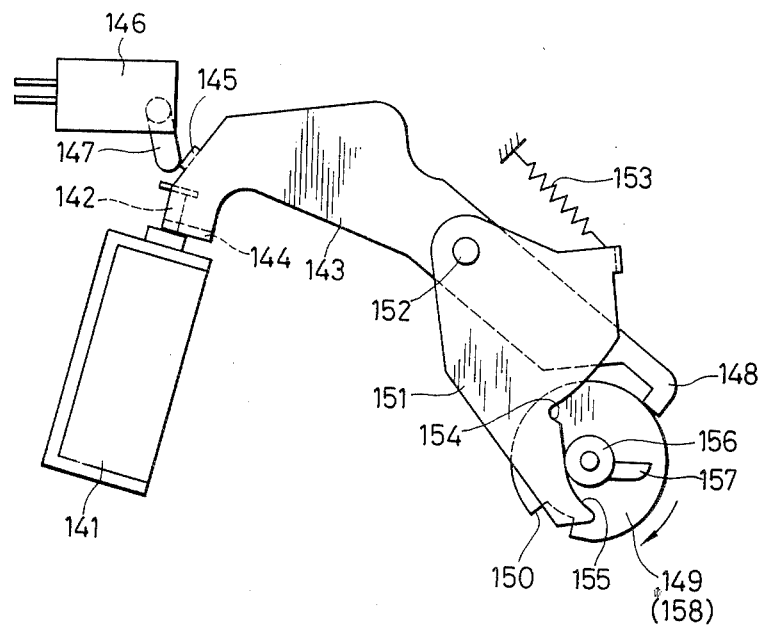
FIG. 30 is an explanatory diagram showing a state of the leaf switch drive mechanism in ejecting.

When the operator depresses an ejection button (not shown) to perform the ejection operation, the depression is detected and an ejection signal is produced by the control section so that the ejection solenoid 141 is energized in response to the ejection signal. Upon energization of the ejection solenoid 141, the actuator 142 is attracted so that the switch lever 143 is rotated about the common axle 152 in the counterclockwise direction to thereby push away the operation member 147 of the leaf switch 146 to turn-on the leaf switch 146. Further, in response to the rotation of the switch lever 143, the stopper click 148 comes off from the engage-stop slot 150 of the ejection gear 149 so as to enable the ejection gear 149 to rotate, and the ejection gear 149 is rotated by the pressing force of the trigger lever 151 through the trigger teeth 157. In response to this rotation of the ejection gear 149, the opposition between the toothless portion 159 of the ejection gear 149 and the small diameter gear 163 of the second idler 117 is released and the drive teeth portion 160 of the ejection gear 149 engages with the small diameter gear 163 so that the ejection gear 149 is clockwise rotated as indicated by an arrow in FIG. 30 by the drive force transmitted to the ejection gear 149 from the small diameter gear 163.

The ejection solenoid 141 is energized for a short time in the beginning of the ejecting operation and deenergized thereafter so that the actuator 142 is separated from the rear end engage-stop member 144 and comes back to the initial position. After coming off from the engage-stop slot 150, the stopper click 148 slides on the peripheral surface of the large cylindrical portion 158 so the the state of the switch lever 143 and the operation member 147 is maintained as it is and the leaf switch 146 is held in its on-state. When the engagement between the pressing slot portion 154 and the trigger teeth 157 is released, the trigger lever 151 is counterclockwise rotated by the tension spring 153, and the rotation of this lever 151 is stopped at the position where the guide edge 155 comes in contact with the circumferential surface of the small cylindrical portion 156.

Further, the rotation of the ejection gear 149 causes the small diameter teeth portion 162 (see FIG. 31) to engage with the rack teeth 164 to move the ejection lever 29 in the direction of the arrow to thereby rotate the main switch lever 165 to turn the main switch 2 off.

Although FIG. 5 shows the state where the tape cassette 6 is loaded in the performance or play position, this state is taken before ejection. In response to the above-mentioned movement of the ejection lever 29, the up/down pin 40 connected with the cassette holder 8 is pushed up by being guided by the stepped guide slot 35 and the slot 41, so that the cassette holder 8 and the holder pressing plate 9 are displaced to the upper position as indicated by a broken line in FIG. 6.

Although the insertion/removal lever 25 is in the rightmost position as shown in FIG, 4 before ejection, it rotates automatically about the pin 26 as the ejection lever 29 moves in the manner opposite to the case of loading of the tape cassette 6. As the result of rotation of the insertion/removal lever 25, the tape cassette 6 is pushed out by the slider 18 to the position as shown in FIG. 1 and held in the position where the tape cassette 6 does not come out but may be easily taken out.

Even if the ejection of the tape cassette 6 has been completed in this manner, the ejection gear 149 continues to rotate so that the trigger teeth 157 enters the inside of the guide edge 155 to cause the trigger lever 151 to clockwise rotate against the elasticity of the tension spring 153 to come back to its initial position. When the stopper click 148 comes in opposition to the engage-stop slot 150 and falls thereinto, the trigger teeth 157 enters the pressing slot 154 so as to terminate one rotation of the ejection gear 149. As described above, as the stopper click 148 falls into the engage-stop slot 150, the switch lever 143 rotates to thereby cause the operation member 147 to rotate so as to turn the leaf switch 146 off. In response to an off-signal of the leaf switch 146, the main motor 3 is turned off to stop its rotation.

Figure 32:
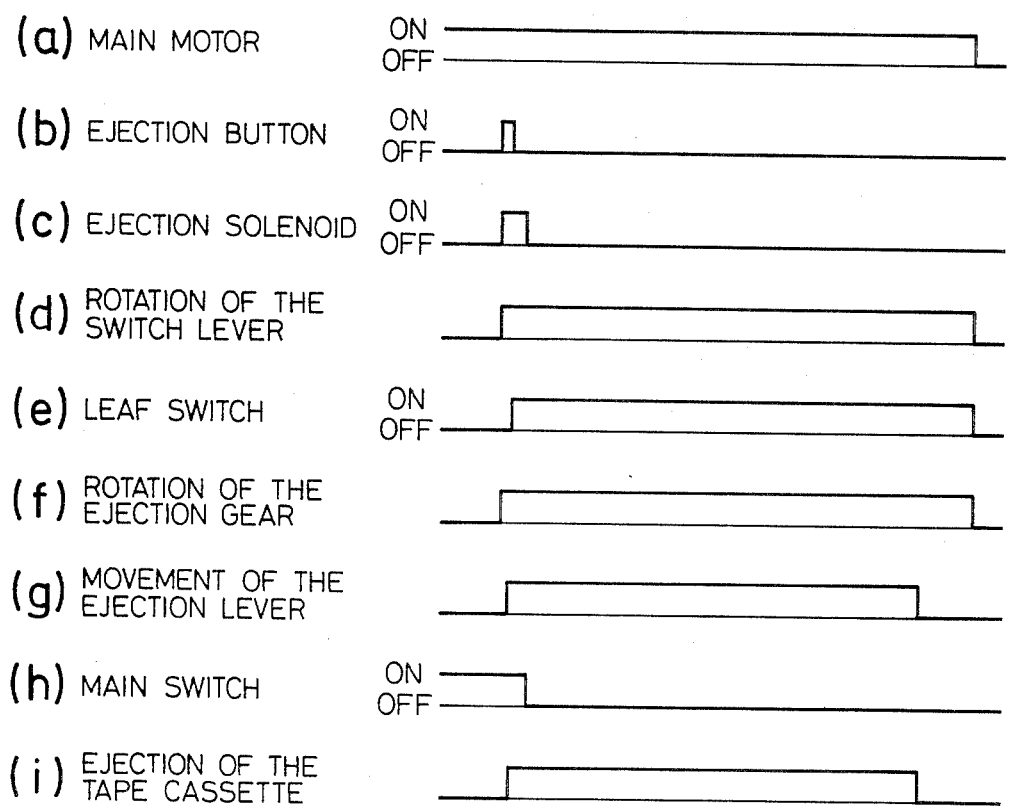
FIGS. 32(a)-32(i) are a timechart of the ejecting operation.

FIG. 32 is a timing-chart of the above-mentioned ejecting operation. As shown in this drawing, upon depression of the ejection button, the ejection lever moves to turn the main switch off, and the tape cassette is discharged by the successive rotation of the ejection lever. Thereafter, the leaf switch is turned off and the main motor is turned off when both the main switch and the leaf switch are in their off-state.

Although the embodiment has been described as to a cassette type tape recorder for the mode of performance (that is reproducing), it is a matter of course that the present invention can be applied to a cassette type tape recorder for use for recording as well as reproducing.

According to the present invention, the cassette type tape recorder is arranged in such a manner, as described above, that the rotation of the cut-off gear and the cam drive idler in the power transmission mechanism is stopped in the operation of performance or play, so that no noise due to engagement between gears is generated. Thus, according to the present invention a cassette type tape recorder with less noise can be provided.

What is claimed is:

1. A cassette tape recorder having a magnetic head and an idler gear cut-off mechanism comprising:
    a drive gear (114) connected to a main motor for providing driving power for functions of the cassette tape recorder;
    a control rotary member (115) and means including a cam portion (119) on said control rotary member for shifting said magnetic head in the recorder from a non-play position to a play position;
    an idler gear (116,117) engaged with said control rotary member for rotating said control rotary member by power transmitted from said drive gear;
    a cut-off gear (168) shiftable between a drive position where it is engaged between said drive gear and said idler gear for rotating said control rotary member, and a non-drive position where it does not transmit power from said drive gear to said idler gear, said non-drive position corresponding to a rotation position of said control rotary member wherein said cam portion has shifted the magnetic head to the play position;
    a single, integrated cut-off lever (171) having a first free end supporting said cut-off gear for movement between said drive and non-drive positions and an engaging portion (172) at a second free end thereof;
    a pivotable first stop lever (123) having a connection portion (127) which is movable by a driving means between a release position and an engaged position, and a stop portion (125) which is shifted between the release position and the engaged position by said connection portion;
    driving means (137) connected to said connection portion of said first stop lever which is actuated to move said connection portion; and
    said control rotary member having a first cam member (169) at an inner diameter position engageable with said engaging portion of said cut-off lever for shifting said cut-off gear to the non-drive position when said control rotary member is rotated to the rotation position corresponding to shifting of the magnetic head to the play position, and a second cam member (122) at an outer diameter position engageable with said stop portion of said first stop lever at the engaged position and released from said stop portion when said stop portion is shifted to the release position,
    whereby when said main motor is running and said driving means is actuated, said first stop lever is shifted to release said second cam member of said rotary control member, and when said rotary control member is rotated to the rotation position corresponding to shifting of the magnetic head to the play position, the engaging portion of said cut-off lever becomes engaged with the first cam member of said control rotary member to shift it to the non-drive position, and the drive power of said drive gear is cut-off from said idler gear after the magnetic head is displaced to the play position by said magnetic head shifting means.

* * * * *